(12) United States Patent
Arett et al.

(10) Patent No.: US 8,413,844 B2
(45) Date of Patent: Apr. 9, 2013

(54) FLUID CONTAINER HAVING AN ADDITIVE DISPENSING SYSTEM

(75) Inventors: Richard Alan Arett, Plymouth, MN (US); Norman Scott Broyles, Hamilton, OH (US); Dimitris Ioannis Collias, Mason, OH (US); William Joseph Cruzen, Monticello, MN (US); David James Emmons, Plymouth, MN (US); John Andrew McDaniel, Middletown, OH (US)

(73) Assignee: Pur Water Purification Products, Inc., El Paso, TX (US)

( * ) Notice: Subject to any disclaimer, the term of this patent is extended or adjusted under 35 U.S.C. 154(b) by 327 days.

(21) Appl. No.: 12/702,542

(22) Filed: Feb. 9, 2010

(65) Prior Publication Data

US 2010/0133297 A1  Jun. 3, 2010

Related U.S. Application Data

(63) Continuation of application No. 11/347,820, filed on Feb. 3, 2006, now Pat. No. 7,670,479, which is a continuation-in-part of application No. 11/158,937, filed on Jun. 22, 2005, which is a continuation-in-part of application No. 10/852,708, filed on May 24, 2004, now abandoned.

(51) Int. Cl.
 *C02F 1/68* (2006.01)
(52) U.S. Cl. .......... 222/36; 222/133; 222/162; 222/470; 210/245; 210/482

(58) Field of Classification Search ............... 210/198.1, 210/205, 206, 244, 245, 473, 474, 477, 482; 222/162, 133, 470, 36
See application file for complete search history.

(56) References Cited

U.S. PATENT DOCUMENTS

| | | | |
|---|---|---|---|
| 1,631,932 A | 6/1927 | Griffin |
| 1,660,174 A | 2/1928 | Parry et al. |
| 2,328,110 A | 8/1943 | Thompson et al. |
| 2,631,521 A | 11/1949 | Atkins, Jr. |
| 2,502,603 A | 4/1950 | Tanner |
| 2,502,610 A | 4/1950 | Wegman |
| 2,705,091 A | 12/1952 | Marchand |
| 2,772,817 A | 12/1956 | Jauch |
| 3,171,571 A | 3/1965 | Daniels |

(Continued)

FOREIGN PATENT DOCUMENTS

| | | |
|---|---|---|
| CZ | 281333 | 8/1996 |
| DE | 20107676 | 8/2001 |

(Continued)

OTHER PUBLICATIONS

USPTO Final Rejection mailed Jan. 20, 2011 in reference to co-pending U.S. Appl. No. 10/852,708, filed May 24, 2004.

(Continued)

*Primary Examiner* — Terry Cecil
(74) *Attorney, Agent, or Firm* — Dinsmore & Shohl, LLP.

(57) ABSTRACT

A fluid container for dispensing a first fluid and a consumable additive. The fluid container includes a first chamber for containing a first fluid and an additive dispensing system. The first chamber is configured such that the first fluid may be dispensed from the first chamber. The additive dispensing system selectively operable to dispense an amount of additive and is not in fluid communication with the first chamber.

18 Claims, 16 Drawing Sheets

U.S. PATENT DOCUMENTS

| | | | |
|---|---|---|---|
| 3,255,691 A | 6/1966 | Schwartz et al. |
| 3,341,083 A | 9/1967 | Stewart |
| 3,375,913 A | 4/1968 | Norris, Jr. |
| 3,519,134 A | 7/1970 | Hassinger |
| 3,568,887 A | 3/1971 | Jacobs et al. |
| 3,784,008 A | 1/1974 | Troglione |
| 3,814,548 A | 6/1974 | Rupp |
| 3,883,429 A | 5/1975 | Hanford |
| 4,324,494 A | 4/1982 | Pryor |
| 4,414,996 A | 11/1983 | Klepa |
| 4,465,488 A | 8/1984 | Richmond et al. |
| 4,469,250 A | 9/1984 | Evezich |
| 4,513,713 A | 4/1985 | Koumura et al. |
| 4,565,302 A | 1/1986 | Pfeiffer et al. |
| 4,582,223 A | 4/1986 | Kobe |
| 4,674,657 A | 6/1987 | Daniels |
| 4,786,500 A | 11/1988 | Wong |
| 4,817,822 A | 4/1989 | Rand et al. |
| 4,860,923 A | 8/1989 | Kirschner et al. |
| 5,036,462 A | 7/1991 | Kaufman et al. |
| 5,045,195 A | 9/1991 | Spangrud et al. |
| 5,076,425 A | 12/1991 | Plone |
| 5,078,874 A | 1/1992 | Sullivan |
| 5,096,721 A | 3/1992 | Levy |
| 5,106,500 A | 4/1992 | Hembree et al. |
| 5,114,045 A | 5/1992 | Herpe |
| 5,114,048 A | 5/1992 | Minke |
| RE33,969 E | 6/1992 | Richter |
| 5,211,973 A | 5/1993 | Nohren, Jr. |
| 5,215,659 A | 6/1993 | Ando |
| 5,268,093 A | 12/1993 | Hembree et al. |
| 5,325,996 A | 7/1994 | Bannigan |
| 5,342,518 A | 8/1994 | Posner et al. |
| 5,353,963 A | 10/1994 | Gorski et al. |
| 5,370,041 A | 12/1994 | Lowe |
| D358,868 S | 5/1995 | Hembree et al. |
| 5,427,682 A | 6/1995 | Vogel et al. |
| 5,431,313 A | 7/1995 | Renault |
| 5,433,343 A | 7/1995 | Meshberg |
| 5,443,739 A | 8/1995 | Vogel et al. |
| D362,583 S | 9/1995 | Weber et al. |
| 5,465,872 A | 11/1995 | Gueret |
| 5,518,743 A | 5/1996 | Pergola et al. |
| 5,525,214 A | 6/1996 | Hembree |
| 5,527,451 A | 6/1996 | Hembree et al. |
| 5,536,394 A | 7/1996 | Lund et al. |
| 5,587,089 A | 12/1996 | Vogel et al. |
| D377,515 S | 1/1997 | Hembree et al. |
| 5,597,487 A | 1/1997 | Vogel et al. |
| D386,041 S | 11/1997 | Tanner et al. |
| 5,707,518 A | 1/1998 | Coates et al. |
| 5,709,694 A | 1/1998 | Greenberg et al. |
| 5,826,755 A | 10/1998 | Burd |
| D406,003 S | 2/1999 | Tanner et al. |
| 5,893,515 A | 4/1999 | Hahn et al. |
| 5,897,770 A | 4/1999 | Hatch et al. |
| 5,918,768 A | 7/1999 | Ford |
| 5,922,378 A | 7/1999 | Kagan et al. |
| 5,928,504 A | 7/1999 | Hembree et al. |
| 5,931,343 A | 8/1999 | Topar et al. |
| 5,941,380 A | 8/1999 | Rothman |
| 5,980,959 A | 11/1999 | Frutin |
| 5,992,685 A | 11/1999 | Credle, Jr. |
| 5,997,734 A | 12/1999 | Koski et al. |
| 6,024,012 A | 2/2000 | Luzenberg, Jr. |
| 6,097,685 A | 8/2000 | Yamaguchi et al. |
| 6,098,735 A | 8/2000 | Sadarangani et al. |
| 6,098,795 A | 8/2000 | Mollstam et al. |
| 6,099,735 A | 8/2000 | Kelada |
| 6,103,114 A | 8/2000 | Tanner et al. |
| 6,105,638 A | 8/2000 | Edwards et al. |
| D438,592 S | 3/2001 | Gaston et al. |
| 6,202,541 B1 | 3/2001 | Cai |
| D440,110 S | 4/2001 | Tanner et al. |
| 6,221,416 B1 | 4/2001 | Nohren, Jr. |
| 6,224,751 B1 | 5/2001 | Hofmann et al. |
| 6,244,474 B1 | 6/2001 | Loeffler |
| 6,290,848 B1 | 9/2001 | Tanner et al. |
| 6,372,270 B1 | 4/2002 | Denny |
| 6,394,312 B1 | 5/2002 | Endou |
| 6,405,900 B1 | 6/2002 | Kown |
| 6,409,046 B1 | 6/2002 | Peckels |
| 6,409,099 B1 | 6/2002 | Goodwin et al. |
| 6,419,118 B1 | 7/2002 | Rees et al. |
| 6,423,224 B1 | 7/2002 | Tanner et al. |
| 6,428,689 B1 | 8/2002 | Kameyama et al. |
| 6,461,498 B2 | 10/2002 | Tseng |
| 6,478,192 B2 | 11/2002 | Heyes |
| 6,482,451 B1 | 11/2002 | Baron |
| 6,527,109 B2 | 3/2003 | Schoo et al. |
| 6,530,495 B1 | 3/2003 | Joseph |
| 6,540,070 B1 | 4/2003 | Conwell |
| 6,565,749 B1 | 5/2003 | Hou et al. |
| 6,602,410 B1 | 8/2003 | Tanner et al. |
| 6,602,541 B1 | 8/2003 | McCurdy et al. |
| 6,651,824 B2 | 11/2003 | Miller |
| 6,652,893 B2 | 11/2003 | Berson |
| 6,672,097 B1 | 1/2004 | Ashley |
| 6,672,817 B2 | 1/2004 | Denny |
| 6,759,072 B1 | 7/2004 | Gutwein et al. |
| 6,770,323 B2 | 8/2004 | Genzer et al. |
| 6,845,788 B2 | 1/2005 | Extrand |
| 6,852,390 B2 | 2/2005 | Extrand |
| 2002/0005377 A1 | 1/2002 | Tanner et al. |
| 2002/0125187 A1 | 9/2002 | Tanner et al. |
| 2002/0139797 A1 | 10/2002 | Danze |
| 2003/0012849 A1 | 1/2003 | Berson |
| 2003/0049352 A1 | 3/2003 | Mehansho et al. |
| 2003/0203075 A1 | 10/2003 | Taylor |
| 2003/0234212 A1 | 12/2003 | Ito et al. |
| 2004/0055948 A1 | 3/2004 | Blum et al. |
| 2004/0084096 A1 | 5/2004 | Whaley |
| 2005/0133420 A1 | 6/2005 | Rinker et al. |
| 2005/0133427 A1 | 6/2005 | Rinker et al. |
| 2005/0145548 A1 | 7/2005 | Rhoades |
| 2006/0016347 A1 | 1/2006 | Girard et al. |

FOREIGN PATENT DOCUMENTS

| | | |
|---|---|---|
| EP | 0 077 208 A1 | 4/1983 |
| EP | 0 077 208 B1 | 6/1985 |
| EP | 0 224 335 A2 | 3/1987 |
| EP | 0 224 335 A3 | 3/1987 |
| EP | 0 224 335 B1 | 3/1987 |
| EP | 0 301 672 A2 | 1/1989 |
| EP | 0 301 672 A3 | 1/1989 |
| EP | 928565 | 7/1999 |
| EP | 1 161 933 A2 | 12/2001 |
| EP | 1 241 110 A1 | 9/2002 |
| EP | 1 310 900 A2 | 5/2003 |
| EP | 1 310 900 A3 | 6/2003 |
| GB | 1286628 | 8/1972 |
| GB | 2299953 | 10/1996 |
| JP | 01075094 | 3/1989 |
| JP | 09085227 | 3/1997 |
| JP | 2002192170 | 7/2002 |
| JP | 2003275752 | 9/2003 |
| KR | 2003020052 | 3/2003 |
| NL | 1019661 | 7/2003 |
| RU | 2198724 | 2/2003 |
| RU | 2206397 | 6/2003 |
| WO | WO 91/15281 | 10/1991 |
| WO | WO 91/19555 | 12/1991 |
| WO | WO 94/06547 | 3/1994 |
| WO | WO 96/01675 A1 | 1/1996 |
| WO | WO 98/15187 | 4/1998 |
| WO | WO 98/46534 | 10/1998 |
| WO | WO 99/26883 | 6/1999 |
| WO | WO 99/35091 | 7/1999 |
| WO | WO 99/35092 | 7/1999 |
| WO | WO 99/38395 A1 | 8/1999 |
| WO | WO 00/09448 A1 | 2/2000 |
| WO | 0039240 | 7/2000 |
| WO | WO 00/38845 | 7/2000 |
| WO | WO 02/40414 A1 | 5/2002 |
| WO | WO 02/096225 A2 | 12/2002 |
| WO | WO 03/022401 A2 | 3/2003 |
| WO | WO 03/022401 A3 | 3/2003 |

| WO | WO 03/031351 | | 4/2003 |
| WO | WO 03/072510 | A1 | 9/2003 |
| WO | WO 03/073029 | A1 | 9/2003 |
| WO | WO 03/090565 | A1 | 11/2003 |
| WO | WO 03/097478 | A1 | 11/2003 |
| WO | WO 2004/013047 | A2 | 2/2004 |
| WO | WO 2004/013047 | A3 | 2/2004 |
| WO | WO 2004/026769 | A1 | 4/2004 |

OTHER PUBLICATIONS

USPTO Non Final Rejection mailed Jun. 21, 2011 in reference to co-pending U.S. Appl. No. 10/852,708, filed May 24, 2004.
USPTO Final Rejection mailed Nov. 4, 2011 in reference to co-pending U.S. Appl. No. 10/852,708, filed May 24, 2004.
USPTO Non-Final Rejection mailed Jun. 24, 2009 in reference to co-pending U.S. Appl. No. 10/852,708, filed May 24, 2004.
USPTO Final Rejection mailed Sep. 18, 2008 in reference to co-pending U.S. Appl. No. 10/852,708, filed May 24, 2004.
USPTO Restriction Requirement mailed May 7, 2008 in reference to co-pending U.S. Appl. No. 10/852,708, filed May 24, 2004.
USPTO Non-Final Rejection mailed Oct. 4, 2007 in reference to co-pending U.S. Appl. No. 10/852,708, filed May 24, 2004.
USPTO Advisory Action mailed Jul. 9, 2007 in reference to co-pending U.S. Appl. No. 10/852,708, filed May 24, 2004.
USPTO Final Rejection mailed Apr. 30, 2007 in reference to co-pending U.S. Appl. No. 10/852,708, filed May 24, 2004.
USPTO Non-Final Rejection mailed Nov. 21, 2006 in reference to co-pending U.S. Appl. No. 10/852,708, filed May 24, 2004.
USPTO Final Rejection mailed Aug. 27, 2009 in reference to co-pending U.S. Appl. No. 11/158,937, filed Jun. 22, 2005.
USPTO Non-Final Rejection mailed Dec. 17, 2008 in reference to co-pending U.S. Appl. No. 11/158,937, filed Jun. 22, 2005.
USPTO Restriction Requirement mailed Aug. 19, 2008 in reference to co-pending U.S. Appl. No. 11/158,937, filed Jun. 22, 2005.
USPTO Restriction Requirement mailed Sep. 12, 2008 in reference to co-pending U.S. Appl. No. 11/159,423.
USPTO Non-Final Rejection mailed Dec. 19, 2008 in reference to co-pending U.S. Appl. No. 11/159,423.
USPTO Final Rejection mailed Jul. 30, 2009 in reference to co-pending U.S. Appl. No. 11/159,423.
USPTO Advisory Action mailed Oct. 5, 2009 in reference to co-pending U.S. Appl. No. 11/159,423.
USPTO Non-Final Rejection mailed Dec. 19, 2008 in reference to co-pending U.S. Appl. No. 11,347,820, filed Feb. 3, 2006.
USPTO Final Rejection mailed Aug. 28, 2009 in reference to co-pending U.S. Appl. No. 11/347,820, filed Feb. 3, 2006.
USPTO Final Rejection mailed Dec. 17, 2009 in reference to co-pending U.S. Appl. No. 10/852,708, filed May 24, 2004.
USPTO Non-Final Rejection mailed Dec. 8, 2009 in reference to co-pending U.S. Appl. No. 11/159,423, filed Jun. 22, 2005.
USPTO Non-Final Rejection mailed Dec. 17, 2009 in reference to co-pending U.S. Appl. No. 11/158,937, filed Jun. 22, 2005.
U.S. Appl. No. 11/159,423, Arett et al., co-pending & commonly assigned.
USPTO Non Final Rejection mailed May 4, 2010 in reference to co-pending U.S. Appl. No. 10/852,708, filed May 24, 2004.
USPTO Elections/Restriction mailed Oct. 13, 2010 in reference to co-pending U.S. Appl. No. 10/852,708, filed May 24, 2004.
USPTO Final Rejection mailed May 6, 2010 in reference to co-pending U.S. Appl. No. 11/158,937, filed Jun. 22, 2005.
USPTO Final Rejection mailed May 4, 2010 in reference to co-pending U.S. Appl. No. 11/159,423, filed Jun. 22, 2005.

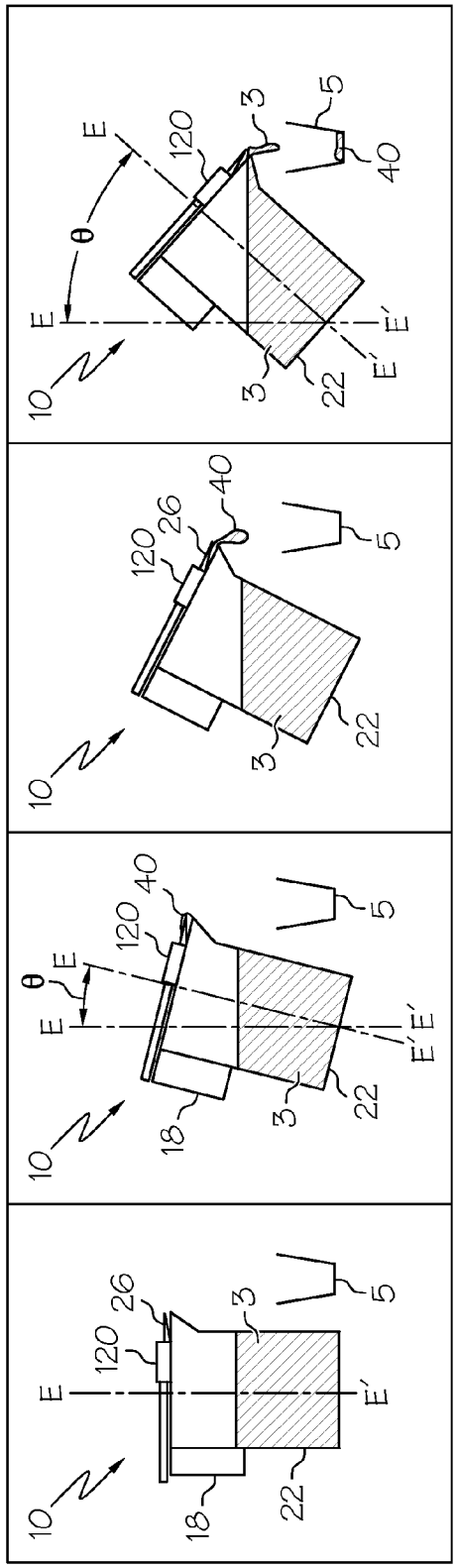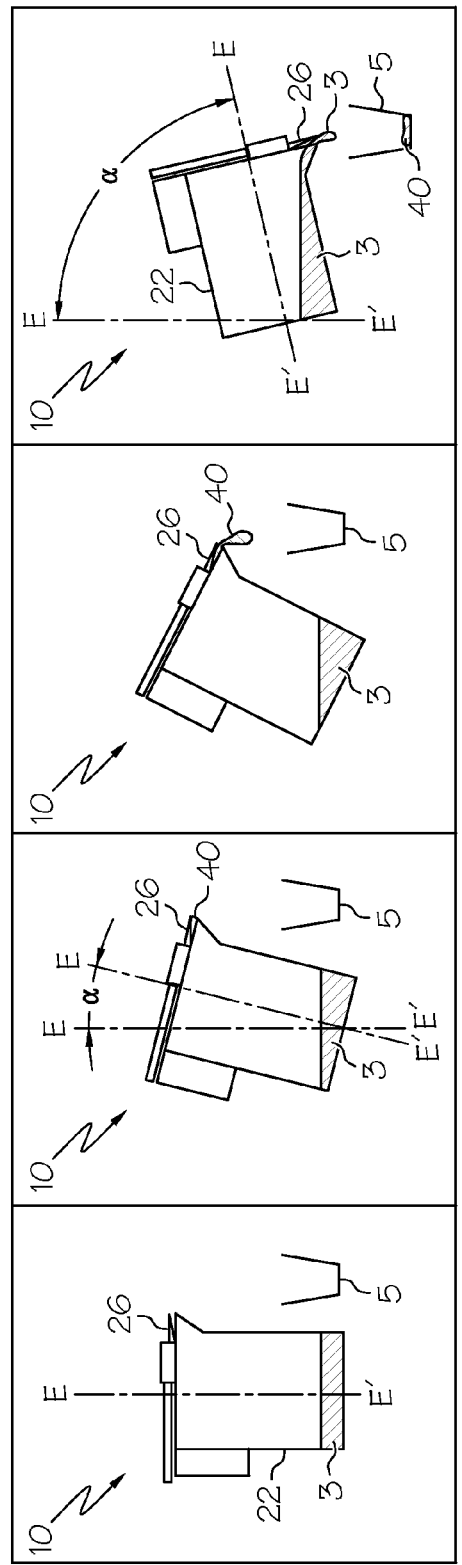
FIG. 4a
FIG. 4b

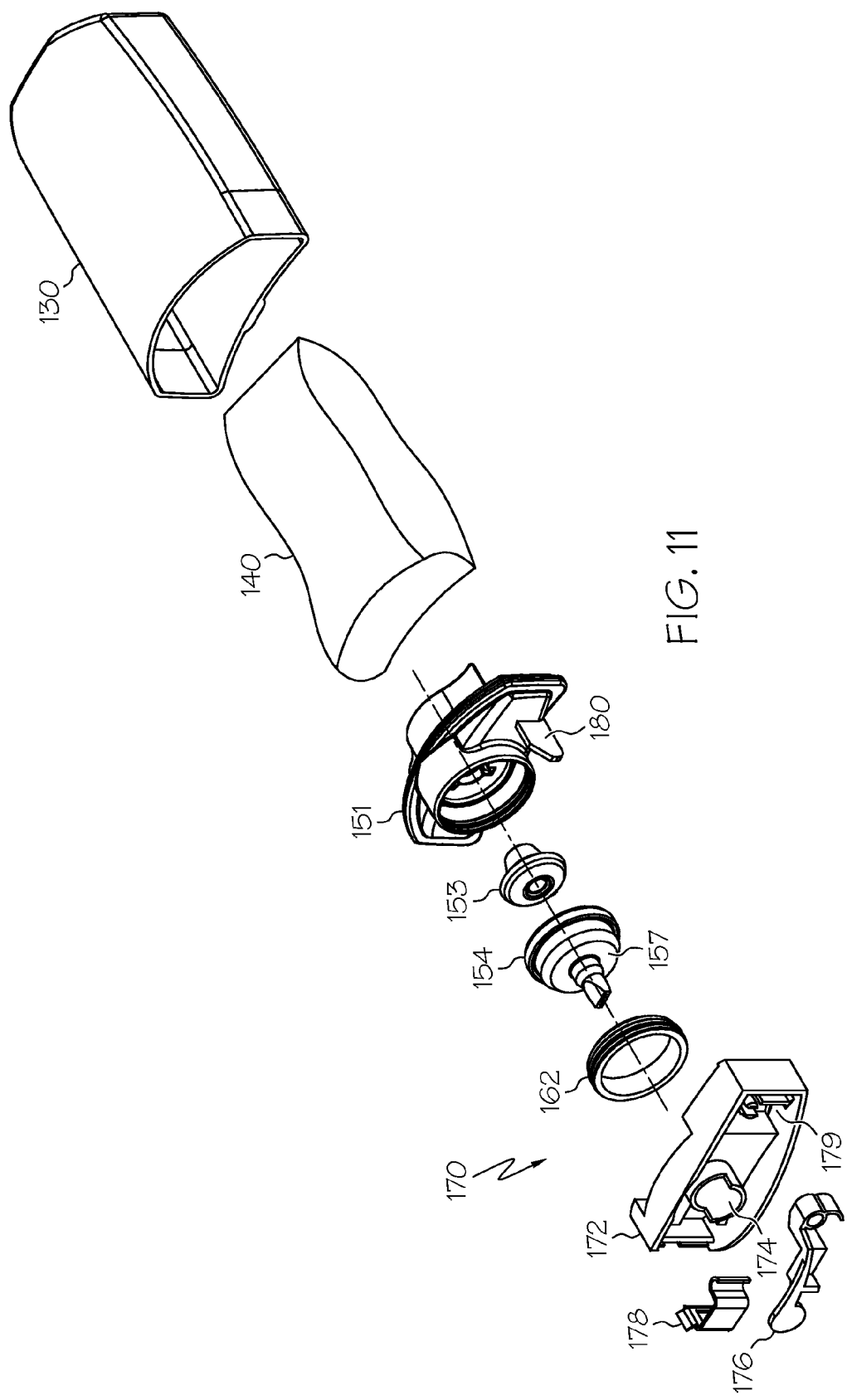

FLUID CONTAINER HAVING AN ADDITIVE DISPENSING SYSTEM

CROSS REFERENCE

This application is a continuation of U.S. application Ser. No. 11/347,820, filed Feb. 3, 2006 now U.S. Pat. No. 7,670,479, which is a continuation-in-part of U.S. application Ser. No. 11/158,937, filed Jun. 22, 2005, which is a continuation-in-part of U.S. application Ser. No. 10/852,708, filed May 24, 2004, now abandoned, all of which are herein incorporated by reference.

FIELD OF THE INVENTION

The present invention relates generally to an additive dispensing system. More particularly, the present invention relates to a fluid container having a cartridge for dispensing a consumable additive to water, and even more specifically to a fluid container having a water filtration system and a disposable, additive dispensing cartridge for dispensing a consumable additive to filtered water.

BACKGROUND OF THE INVENTION

Water treatment devices for home and other uses are well known in the art. Such devices are typically incorporated in a water system either in-line or at a terminal end. An example of the former would be an under-the-counter device which filters water prior to reaching a faucet outlet. There are two common types of terminal end devices—countertop and faucet mounted. Water treatment devices can treat water by the use of mechanical filtration or chemical treatment. Most water-filtration systems use a filter-cartridge containing either activated carbon or a combination of activated carbon and an ion-exchange resin. The activated carbon serves to filter out particulates and other impurities, while eliminating most of the chlorine present in the water. The ion-exchange resin removes positive ions such as calcium, thereby softening the water. A negative side-effect of the above-mentioned systems is that various other healthy minerals can be removed by the ion-exchange resin. An alternative method of water purification is reverse osmosis, but products using this technology are not widely utilized by household consumers due to their high costs.

In recent years, consumption of water by people has risen due to better health education and other information available to the public. However, public perception of the poor quality and taste of regular tap water has led to the development and sale of a number of products addressing these problems. Various bottled waters are available to consumers. Some of these bottled waters have additional additives which the consumer may find beneficial. Such additives include nutrients, vitamins, minerals and flavorings. These bottled waters are sometimes called fitness waters, vitamin waters or enhanced waters. However, the cost and inconvenience of obtaining enhanced bottled water products on a regular basis may discourage consumers from consuming additional water. Accordingly, a more convenient and cost effective approach for providing enhanced water to the public is needed.

SUMMARY OF THE INVENTION

The present invention is directed to a fluid container having an additive dispensing system.

One embodiment of the present invention is a fluid container for dispensing a first fluid and a consumable additive. The fluid container includes a first chamber for containing a first fluid and an additive dispensing system. The first chamber is configured such that the first fluid may be dispensed therefrom. The additive dispensing system is selectively operable to dispense an amount of additive. The additive dispensing system is not in fluid communication with the first chamber.

Another embodiment of the present invention is a fluid container for dispensing a first fluid and a consumable additive. The fluid container includes a first fluid chamber for containing a first fluid, an additive dispensing system disposed adjacent to the first fluid chamber and operable to dispense an amount of additive, and a second additive reservoir disposed adjacent to the additive dispensing system such that it may receive and contain the amount of additive dispensed from the additive dispensing system separate from the first fluid chamber. The fluid container is configured such that when tilted an amount of first fluid may pour from the first fluid chamber and the amount of additive may pour from the second additive reservoir.

Yet another embodiment of the present invention is a fluid container for dispensing a first fluid and a consumable additive. The fluid container includes a first fluid chamber for containing a first fluid, an additive dispensing system disposed adjacent to the first fluid chamber and selectively operable to dispense an amount of additive, and a surface downstream of the additive dispensing system that is ultrahydrophobic, ultralyophobic, or ultraclean.

BRIEF DESCRIPTION OF THE DRAWINGS

While the specification concludes with claims particularly pointing out and distinctly claiming the invention, it is believed the same will be better understood from the following description taken in conjunction with the accompanying drawings in which:

FIG. 4a is a schematic view of an exemplary fluid container having an additive dispensing system according to an embodiment of the present invention;

FIG. 4b is a schematic view of an exemplary fluid container having an additive dispensing system according to an embodiment of the present invention;

FIG. 11 is an exploded, perspective view of an exemplary additive dispensing system according to an embodiment of the present invention;

FIG. 13b is a top plan view of the exemplary bubble film according to FIG. 12a;

FIG. 14b is a top plan view of the exemplary molded film according to FIG. 13a;

Figure 1:
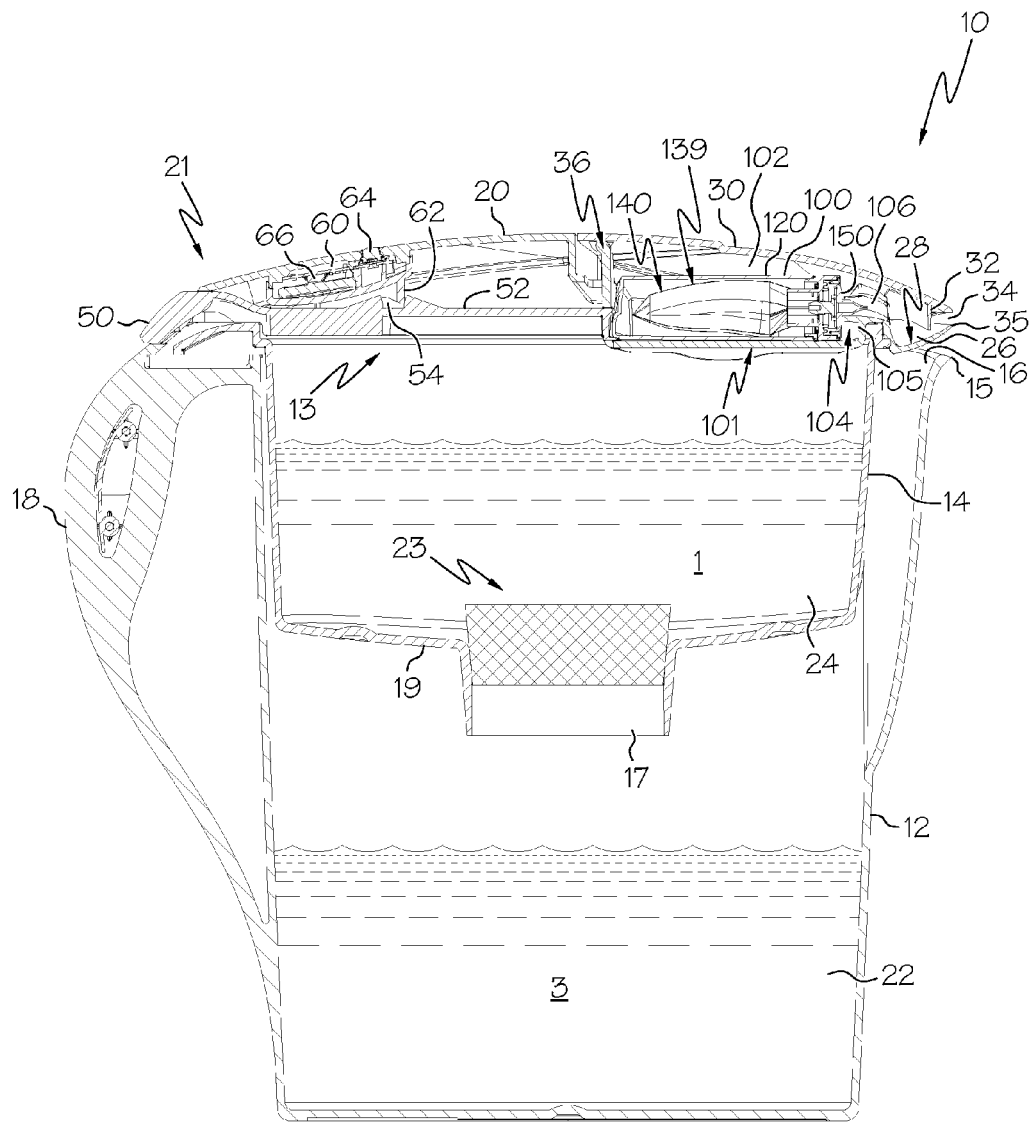
FIG. 1 is a side elevational view of an exemplary fluid container having an additive dispensing system according to an embodiment of the present invention.

The embodiments set forth in the drawings are illustrative in nature and not intended to be limiting of the invention defined by the claims. Moreover, individual features of the drawings and the invention will be more fully apparent and understood in view of the detailed description.

DETAILED DESCRIPTION OF THE INVENTION

Reference will now be made in detail to various embodiments of the invention, examples of which are illustrated in the accompanying drawings, wherein like numerals indicate similar elements throughout the views.

FIGS. 1-5 show an exemplary embodiment of a fluid container 10 of the present invention. Fluid container 10 includes an additive dispensing system 100 for dispensing an additive and optionally a filter 23. Fluid container 10 may also be combined with a variety of additive dispensing systems that are configured to contain an additive and then dispense the additive as known to one of ordinary skill in the art. The additive dispensing system of the present invention may be configured to selectively operable to dispense an amount of additive from a reservoir of the additive dispensing system. In one embodiment, additive dispensing system 100 may comprise an additive dispensing cartridge 120 and a receptacle 101. However, it should be understood that fluid container 10 is shown and described herein with additive dispensing cartridge 120 and receptacle 101 for illustration purposes only, and not limitation.

In the exemplary embodiment shown in FIGS. 1-5, fluid container 10 includes an outer container shell 12 that forms a first chamber 22. Fluid container 10 may, for example, be a pitcher for containing and pouring several servings of drinking water. As shown, the exemplary embodiment of the fluid container 10 includes a handle 18 and a pour spout 16. First chamber 22 of fluid container 10 is configured to contain and hold a first fluid. The first fluid may comprise any conventional, consumable liquid such as water, filtered water, beverages, etc.

Fluid container 10 may also include an inner shell 14 located within an upper portion of first chamber 22 and removably connected to outer shell 12. Inner shell 14 forms a second chamber 24 having an aperture 17 disposed within a bottom wall 19 of inner shell 14, placing second chamber 24 in fluid communication with first chamber 22. Inner shell 14 is configured to contain and channel the first fluid such that it drains through aperture 17 and into first chamber 22. In the exemplary embodiment, a filter 23 is positioned over and/or within aperture 17 such that when first fluid drains to and through aperture 17, it flows through filter 23. For example, when an unfiltered, first fluid 1 is poured into second chamber 24, first fluid 1 flows through filter 23 into first chamber 22. After first fluid 1 flows through filter 23, it is now a filtered, first fluid 3 and will be held in first chamber 22 until fluid container 10 is tilted at an angle to pour first fluid 3 from first chamber 22 via spout 16 into a second container 5 such as a drinking glass.

Water filter 23 may comprise any water filter technology known to one of ordinary skill in the art. Suitable water filter media may include, but are not limited to, activated carbon or the like for removal of organics from the water; halogenated resin fibers and/or halogenated resin beads or other media, for destroying bacteria and viruses within the water; ion exchange resins (such as halogen based action exchange resin for the removal of sodium) for removal of ionic materials from the water; and removing bacteria by microfiltration. One exemplary water filter that may be employed in the present invention is disclosed by Hou et al., U.S. Pat. No. 6,565,749, and is herein incorporated by reference. Other exemplary water filters that may be included in the present invention are the PUR water filter systems commercially available from The Procter & Gamble Company of Cincinnati, Ohio.

Figure 2:
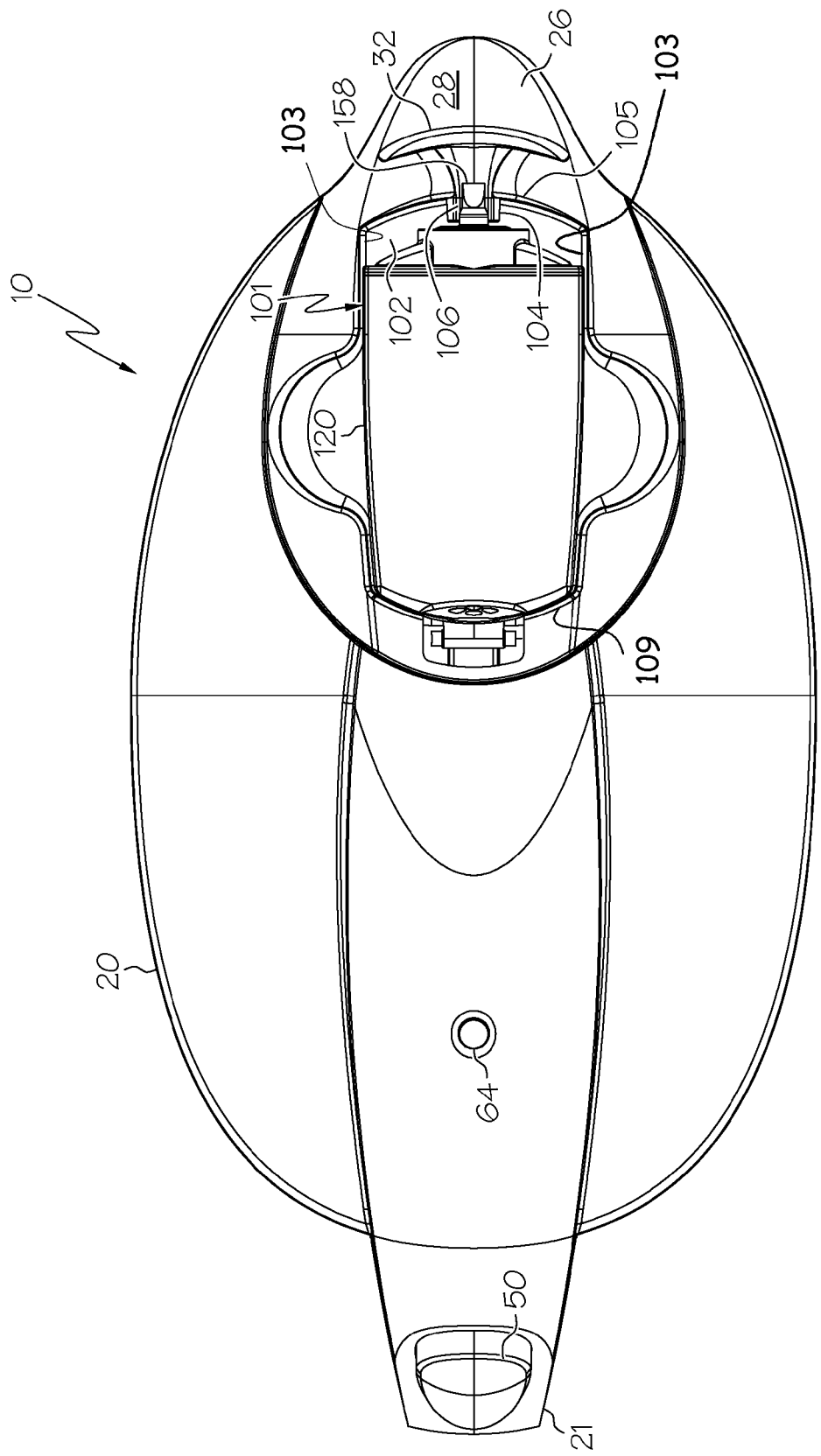
FIG. 2 is a top plan view of the exemplary fluid container without a cover according to FIG. 1.
Figure 3:
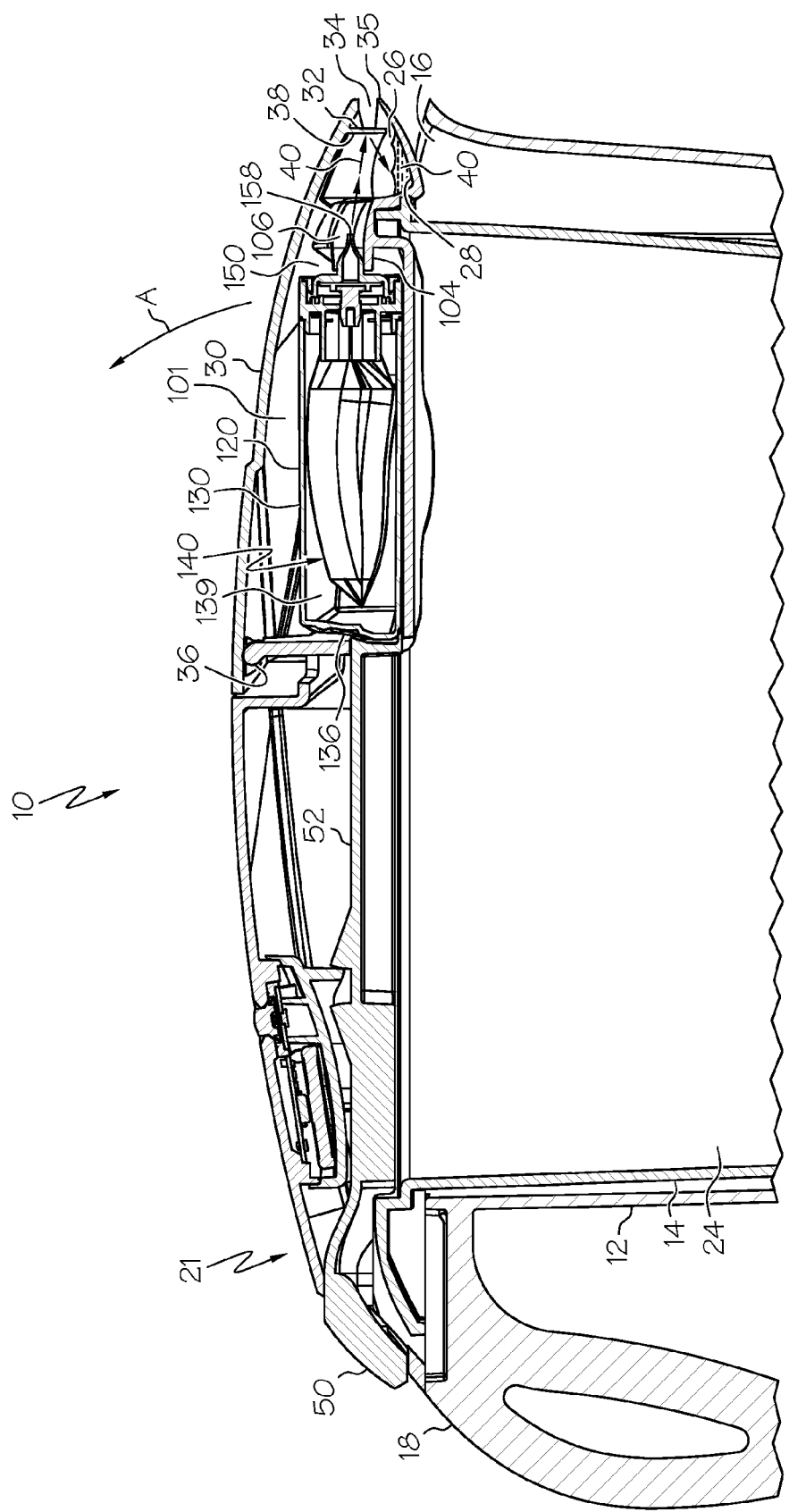
FIG. 3 is a side elevational view of the exemplary fluid container according to FIG. 1.

In the exemplary embodiment shown, fluid container 10 is a pitcher that includes an open end 13 along an upper portion of outer shell 12. Open end 13 is in fluid communication with second chamber 24 and thus permits first fluid 1 to be poured into open end 13, and ultimately into second chamber 24. A lid 20 may be configured to be positioned upon shell 12 to cover open end 13 and second chamber 24. Lid 20 may be configured such that it is removable from its position covering open end 13. In addition, lid 20, in the exemplary embodiment, includes receptacle 101, which is integrally fabricated into an upper portion of lid 20 as shown in FIGS. 1-3. However, it is understood that receptacle 101 may be a separate component that is either temporarily or permanently affixed to lid 20 without departing from the spirit and scope of the present invention. For example, receptacle 101 may be glued to lid 20 using any conventional adhesive as known to one of ordinary skill in the art. Receptacle 101 is configured to receive additive dispensing cartridge 120 such that the cartridge may move (e.g., slide) within receptacle 101 to selectively operate the dispensing of an amount of additive 40 from additive dispensing cartridge 120 and may be easily removed from the receptacle at any time.

Receptacle 101 may include a space 102 configured to receive and hold cartridge 120 in the receptacle in a movable engagement. For example, cartridge 120 may slide within space 102 along a longitudinal axis A1 of cartridge 120. Receptacle 101 may also include a pump activation device that is configured to operate the pump when cartridge 120 is positioned within receptacle 101. As shown in FIGS. 1-3, the pump activation device comprises an annular protrusion 104 extending from a surface 105 of receptacle 101 and surrounding an aperture 106 that is disposed within surface 105. Other exemplary pump activation devices may include toggle mechanisms, levers, linear cams, rotary cams, and like mechanisms as shown in FIGS. 10A-10I. Such mechanisms are configured to actuate a pump 150 of the additive dispensing system, manually or automatically (e.g., motor actuated, solenoid actuated).

Lid 20 may also include a cover 30 that is connected to lid 20 via a hinge 36. Cover 30 is configured to enclose receptacle 101 to provide it and cartridge 120 with protection from dirt, debris, and damage. Also, cover 30 may be configured such that it covers a second additive reservoir 26 (described below) as well. Hinge 36 permits cover 30 to swing up and away from receptacle 101, providing access to receptacle 101, and ultimately, cartridge 120 contained within receptacle 101. By providing access to receptacle 101, cover 30 permits a user the ability to remove and/or insert additive dispensing cartridge 120 into receptacle 101. Lid 20, receptacle 101, or cover 30 may comprise any size, shape, and configuration without departing from the spirit and scope of the present invention. Exemplary materials of construction for lid 20, receptacle 101, or cover 30 may include metals, plastics, composite materials, and combinations thereof. In one exemplary embodiment, polymers are used to construct lid 20, receptacle 101, and cover 30, for example, polypropylene (PP), polyethylene terephthalate (PET), high density polyethylene (HDPE), low density polyethylene (LDPE), polyvinyl chloride (PVC), polystyrene, nylon, polyester, elastomers, thermoplastic elastomers (TPE), silicone, neoprene, and any combinations thereof.

Referring to FIGS. 6-9, an exemplary embodiment of the additive dispensing cartridge 120 of the present invention is shown for illustration purposes only, and not limitation. In the exemplary embodiment, cartridge 120 is a replaceable and/or disposable cartridge. Being replaceable/disposable allows a user to remove cartridge 120 when the additive has been completely consumed (e.g., cartridge 120 is empty of the additive) and to replace the depleted cartridge with a new, unused cartridge (e.g., a cartridge filled with an additive). Alternatively, additive dispensing system 100 allows a user to simply and easily replace a cartridge 120 containing a specific additive (e.g., lemon flavor) and replace it with a different desired additive (e.g., cherry flavor).

In the exemplary embodiment, additive dispensing cartridge 120 includes a housing 130, a reservoir 139, a bladder 140 disposed within reservoir 139, and pump 150 in communication with the bladder. Housing 130 includes sidewalls 132, 133, 134, and 135, a closed end 136 and an open end 137 that form reservoir 139. In this embodiment, cartridge 120 optionally includes a bladder 140 disposed within reservoir 139 to contain a consumable additive as described below herein. Pump 150 is connected to housing 130 at open end 137 and is in fluid communication with bladder 140. It is understood that cartridge 120 could not include bladder 140 and thus contain the additive within reservoir 139. Alternatively, cartridge 120 could be configured such that it contains the additive within bladder 140, but not include reservoir 139 to place the bladder within.

Additive dispensing cartridge 120 is operable to selectively dispense an amount of additive 40 from bladder 140. In one embodiment, the additive in bladder 140 is in a liquid form. In another embodiment, the additive in bladder 140 is in the form of a dry powder. The additive comprises one or more additives selected from the group consisting of flavorings, vitamins, minerals and nutrients. Additive minerals include minerals selected from the group consisting of ions calcium, silicate, chloride, magnesium, potassium, sodium, selenium, zinc, iron, manganese and mixtures thereof. Vitamin additives comprise vitamins selected from the group consisting of vitamin B12, vitamin C and mixtures thereof. In other embodiments, homeopathic remedies and herbal remedies, as well as flavorings, may be included as additive in bladder 140.

In one embodiment, the additive comprises hydroalcoholic extracts of natural oils. Other additives may comprise elixirs, spirits or essences and tinctures. An elixir is a clear, sweetened hydroalcoholic liquid intended for oral use. The alcohol content ranges from about 5% to about 50% by volume. Spirits or essences are alcoholic or hydroalcoholic solutions prepared from vegetable or chemical substances. The concentration of the solute varies up to 50%. The hydroalcoholic extracts of natural oils range from about 0.025 to about 0.5% by volume of the filtered water to deliver a hint of flavor to the filtered water. Depending upon the size of the glass and the number of shots dispensed into the glass, the range set forth above could be larger. In another exemplary embodiment, 1 to 5 shots of 0.2 ml of concentrated flavor may be dispensed in a 250 ml glass of a beverage such as water. In another embodiment, the additives may comprise one or more coloring agents, such as food coloring, to add a color to the filter water. Exemplary flavors comprise lemon, lime, berry, citrus, orange, strawberry and mixtures of the same.

Fluid container 10 and its additive dispensing system 100 are infinitely flexible as to the concentration of the dispensed additive relative to the dispensed beverage. The present invention allows a user to customize the amount of additive to each individual glass poured from first chamber 22 as compared to conventional systems that require the additive to be dispensed into the entire container of beverage (e.g., water) before pouring. Such systems did not permit individualized or customized additive concentrations for each individual poured glass of beverage. In one embodiment, the additive dispensing system is operable to selectively dispense from about 0.01 ml of additive to about 1.0 ml of additive per 250 ml of water filtered by the filter. In a further embodiment, the additive dispensing system is operable to selectively dispense from about 0.1 ml of additive to about 0.5 ml of additive per 250 ml of water filtered by the filter. In another embodiment, the additive dispensing system is operable to selectively dispense from about 0.025 to about 0.25% additive by volume of water filtered by the filter. In a further embodiment, the additive dispensing system is operable to selectively dispense from about 0.05 to about 0.1% additive by volume of water filtered by the filter.

Figure 7:
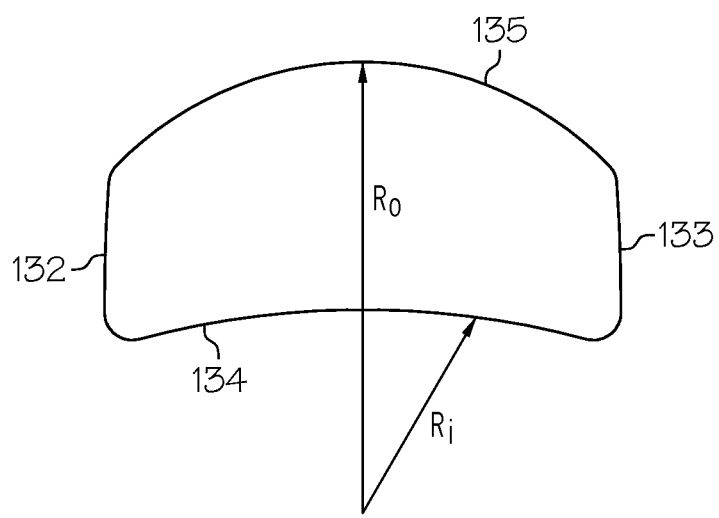
FIG. 7 is a cross sectional view of an exemplary housing for the cartridge according to FIG. 5.

In this exemplary embodiment, sidewalls 134 and 135 are substantially curved such that housing 130 has a curved cross section as shown in FIG. 7. The curved shape of housing 130 is configured to permit cartridge 120 to function within multiple devices (e.g., water faucet mounted filter systems, pitcher mounted systems, portable additive dispensing systems, refrigerator, etc.). In addition, although the shape of housing 130 may be designed to permit it to function in multiple devices, it also may be configured to provide an ample reservoir volume for containing a reasonable amount of an additive. Thus, the exemplary embodiment of curved-shaped housing 130 provides a balance between the two. In addition, the cartridge has a width that permits two cartridges to fit into a water pitcher receptacle. An exemplary width of cartridge 120 is from about 0.5 inches to about 3.0 inches, another exemplary width of cartridge 120 ranges from about 1.0 inch to about 2.0 inches, particularly about 1.5 inches. Cartridge 120 may comprise a length from about 0.5 inches to about 4.0 inches, more particularly from about 2.0 inches to about 3.0 inches.

Housing 130 may be curved to substantially conform to the curvature of rear surface 109 of receptacle 101 to permit a tighter fit (i.e., a close tolerance fit) between receptacle 101 and cartridge 120. This allows cartridge 120 to move smoother and more efficiently within receptacle 101. FIG. 7 illustrates that the curved-shaped housing 130 includes two convex-shaped sidewalls 134 and 135 that are curved in the same general direction, i.e., the convex curvatures of both sidewalls 134 and 135 face the same direction. In one exemplary embodiment, curved sidewalls 134 and 135 are substantially parallel to one another. FIG. 7 also shows that the cross section of housing 130 includes an inner radius $R_i$ and an outer radius $R_o$. Inner radius may range from about 2.0 inches to about 10.0 inches and outer radius $R_o$ may range from about 0.5 inches to about 5.0 inches in one exemplary embodiment. In still another exemplary embodiment, inner radius may range from about 4.0 inches to about 6.0 inches and outer radius $R_o$ may range from about 1.5 inches to about 2.5 inches. It is understood that housing 130 may comprise a variety of known shapes, configurations, and sizes without departing from the spirit and scope of the present invention.

Housing 130 may be fabricated from any conventional materials as known to one of ordinary skill in the art. Such material may be rigid material, semi-rigid material, flexible material, or any combination thereof. In the exemplary embodiment, housing 130 is fabricated from a substantially rigid material. Exemplary materials for housing 130 include, but not be limited to polymeric material, such as polypropylene (PP), polyethylene terephthalate (PET), high density polyethylene (HDPE), low density polyethylene (LDPE), polyvinyl chloride (PVC), polystyrene, nylon, polyester, aluminum foil, flexible barrier material, and any combination thereof. In one exemplary embodiment, housing 130 is fabricated from high density polyethylene (HDPE) from DOW Plastics, with a grade of 12450N. In another exemplary embodiment, housing 130 may include a substantially rigid frame-work (i.e., without side walls 132, 133, 134, and 135) to minimize material costs and weight.

Bladder 140 may be any type of conventional bladder or liner configured to contain an additive in liquid, gel, or powder form as known to one of ordinary skill in the art. In the exemplary embodiment, bladder 140 is a flexible, gusseted bag or pouch that includes a vapor barrier (not shown). Such a flexible bladder permits cartridge 120 to be positioned in any orientation (e.g., horizontal or vertical) and still permit substantially all of a liquid additive contained within bladder 140 to be dispensed from it without requiring a venting or pressure relief device to assist in dispensing the additive completely from bladder 140. Bladder 140 may comprise single or multiple-layered materials and/or laminates, including but not limited to foil laminates or metalized film bags, as known to one ordinary skill in the art. Such materials may include a vapor barrier, vapor barrier properties, or other suitable barrier properties. These laminates or film bags may also include a polyethylene laminate on its sealing surfaces. One exemplary foil laminate is commercially available from Sonoco, Inc. Because the present invention uses such a bladder, cartridge 120 may be connected to fluid container 10 via receptacle 101 in a horizontal orientation. However, it is understood that cartridge 120 may be connected to fluid container 10 such that it may be positioned in a vertical or any other orientation.

In the exemplary embodiment, pump 150 is designed to be disposable as a part of additive dispensing cartridge 120 that is also disposable. In alternate embodiments, the pump may be separate from bladder 140, and, individually may be permanent or disposable. There are several benefits of configuring cartridge 120 to include a disposable pump versus designing the pump to be a permanent fixture of additive dispensing system 100 (e.g., connected to receptacle 101), and thus not disposable. First, a disposable pump (e.g., pump 150) eliminates the issue of bacteria growth within the pump due to additive accumulation (e.g., residue) within the pump after being dispensed by the pump.

Second, a disposable pump (e.g., pump 150) reduces pump reliability issues. If the pump was a permanent fixture of additive dispensing system 100, it would wear and breakdown over time due to repeated operations. Or, the pump would need to be fabricated to account for such repeated operation, which would increase its cost and weight. However, since pump 150 is replaced with the depletion of the additive within bladder 140, it may be configured to handle the number of pump operations required to deplete the amount of additive contained within bladder 140, making it a much cheaper pump. It also provides for an improved reliability for additive dispensing system 100.

Third, if the pump is not disposable, but is replaced with the cartridge, i.e., the pump is individually disposable, as desired, then the additive accumulation of one type of additive (e.g., lemon flavor residue) within the pump may cross-contaminate a new additive (e.g., cherry flavor), thus providing a consumer a dissatisfying taste and experience. By making pump 150 disposable with cartridge 120, the cross-contamination of flavors within the pump is substantially eliminated. It is understood that cartridge 120 may be configured to be a reusable and/or refillable cartridge without departing from the spirit and scope of the present invention. However, since pump 150 will essentially be disposed of or replaced with every disposal or replacement of the consumable additive, it may be desirable to configure an inexpensive pump (e.g., pump 150) to selectively dispense the additive from bladder 140.

Figure 6:
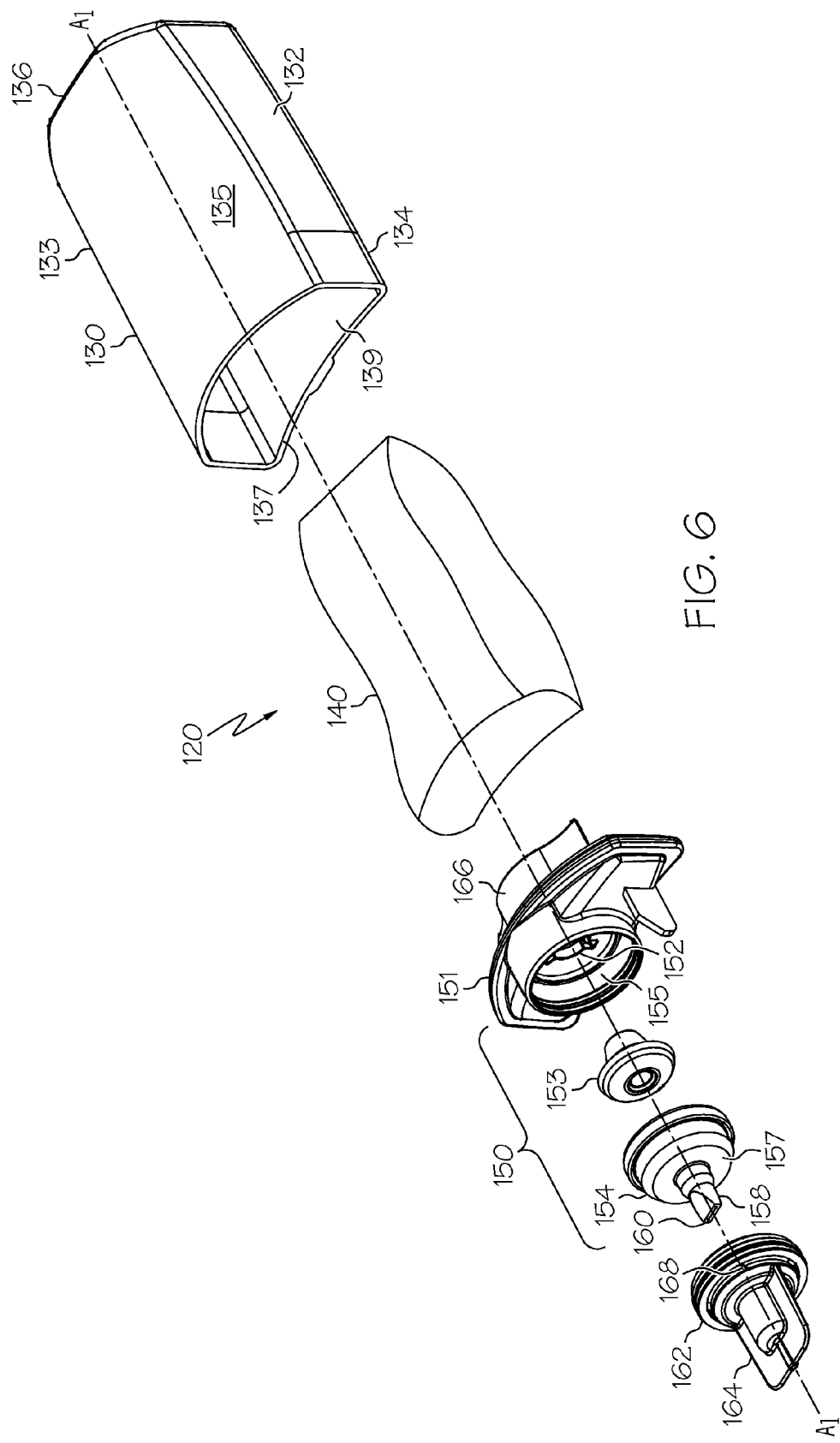
FIG. 6 is an exploded, perspective view of an exemplary cartridge according to an embodiment of the present invention.
Figure 8:
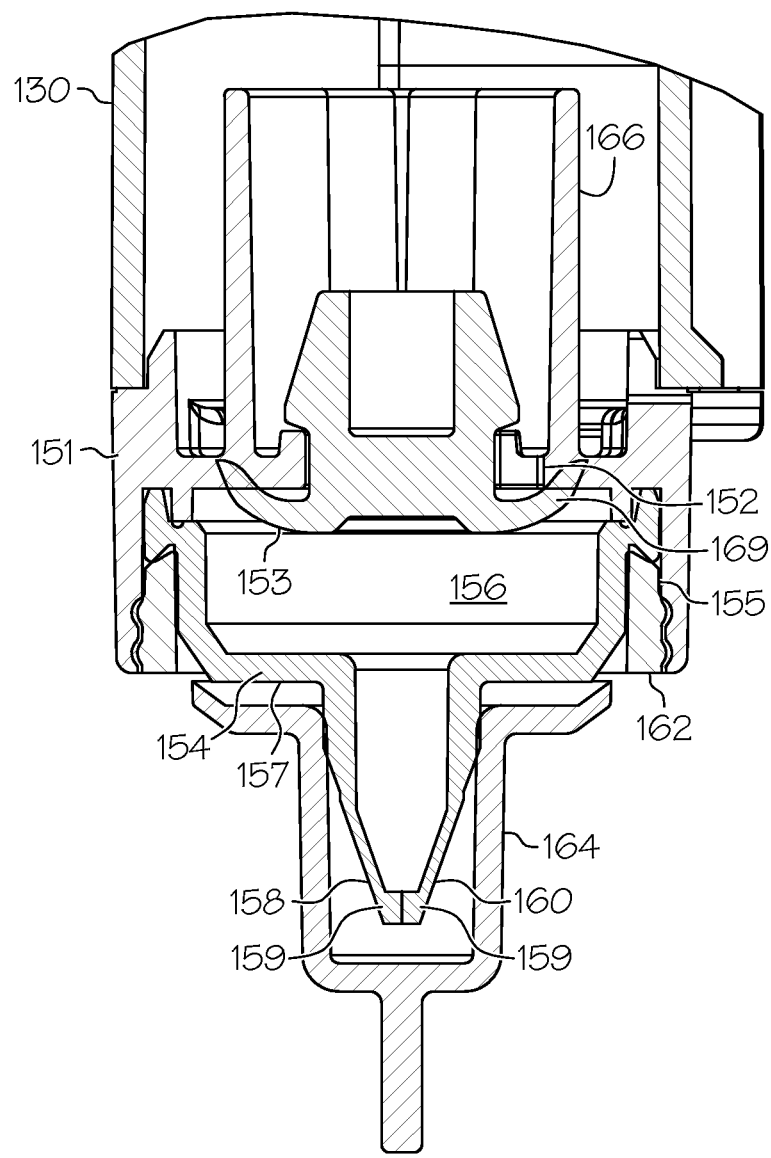
FIG. 8 is a cross sectional view of an exemplary cartridge according to FIG. 1.
Figure 9:
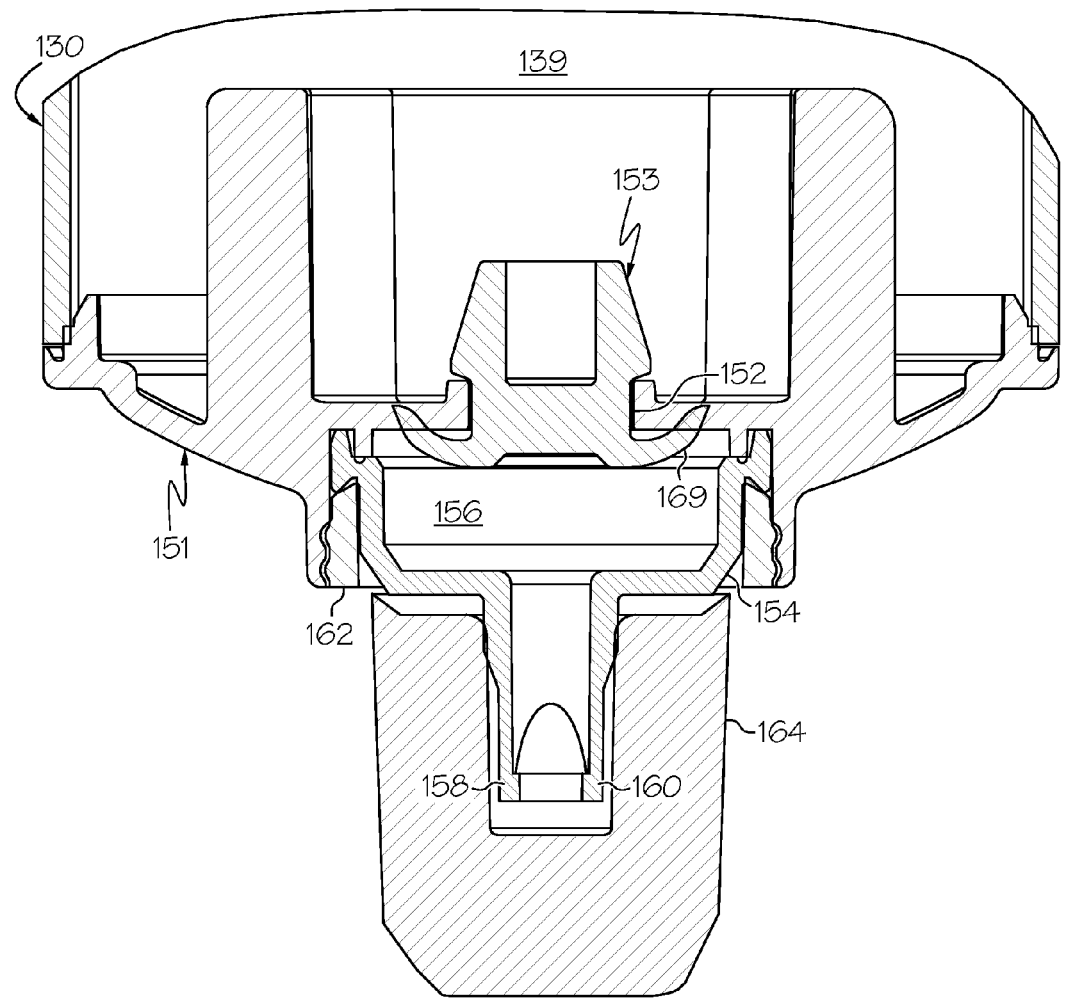
FIG. 9 is a cross sectional view of an exemplary cartridge according to FIG. 1.
Figure 10A:
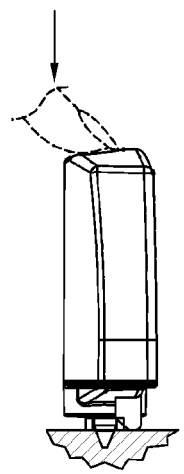
FIGS. 10A-10I are schematic representations of exemplary actuation mechanisms for the additive dispensing system according to FIG. 1.
Figure 10B:
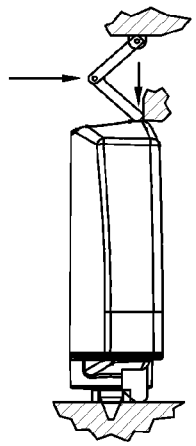
Figure 10C:
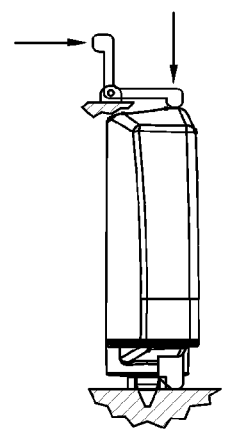
Figure 10D:
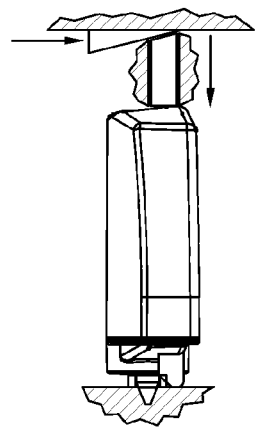
Figure 10E:
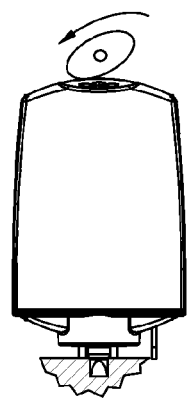
Figure 10F:
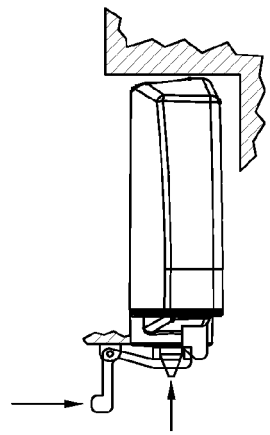
Figure 10G:
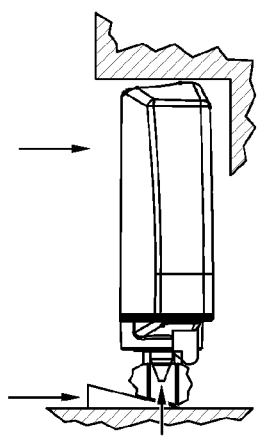
Figure 10H:
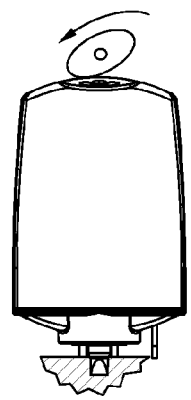
Figure 10I:
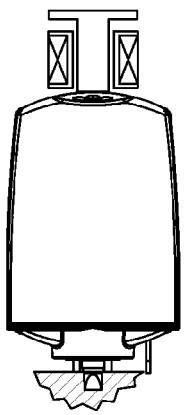

The exemplary pump 150 shown in FIGS. 6, 8, and 9 includes a pump body 151 having a pump opening 152 disposed therethrough, an inlet check valve 153 positioned in pump opening 152 in a normally closed position, a diaphragm 154 disposed within a cavity 155 over inlet check valve 153, and an outlet check valve 158 disposed along diaphragm 154. As shown in FIG. 6, pump 150 is axially aligned with housing 130, which also axially aligns pump 150 with bladder 140. Axially aligned, as used herein, means that pump opening 152 is coaxially positioned along the housing's longitudinal axis A1. This axial alignment of pump 150 with housing 130 provides for improved pumping and dispensing of the additive from bladder 140. It permits a smaller pump to be used in cartridge 120 because the axial alignment reduces the required pumping forces. In the exemplary embodiment shown, bladder 140, pump body 151, inlet check valve 153, diaphragm 154, and outlet check valve 158 include a fluid flow path that runs along longitudinal axis A1 of housing 130.

Pump body 151 may be fabricated from a variety of conventional plastics such as high density polyethylene (HDPE). An exemplary HDPE is commercially available from Dow Plastic, grade 12450N. In this exemplary embodiment, inlet check valve 153 positioned in pump opening 152 functions as both a self-sealing seal (e.g., septum) for bladder 140 and a one-way check valve. This multi-functionality reduces the number of required components and thus the expense to fabricate cartridge 120. When diaphragm 154 is positioned over inlet check valve 153, it defines a dose chamber 156. Diaphragm 154 includes a planar surface 157 and an outlet check valve 158 that is integrated into diaphragm 154 such that it extends outwardly from planar surface 157 and is in fluid communication with chamber 156. Chamber 156 is also in fluid communication with inlet valve 153. Having diaphragm 154 and outlet check valve 158 integrated into one component reduces the expense of fabrication and the complexity of pump 150. Although inlet check valve 153 is described with multiple functionality (e.g., valve and seal) and diaphragm 154 is described as having outlet check valve 158 integrated therein, it is understood that a pump having a discrete seal, inlet check valve, diaphragm, and outlet check valve is within the spirit and scope of the present invention.

Outlet check valve 158 includes a pair of sealing surfaces 159 that are positioned on a distal end 160 of outlet check valve 158. Outlet check valve 158 is extended and configured such that once the additive being dispensed from cartridge 120 passes sealing surfaces 159, the additive has completely left the cartridge and will have no other contact with either cartridge 120 or receptacle 101. In other words, neither cartridge 120 nor receptacle 101 have dead space in its flow path downstream of sealing surfaces 159. Since both cartridge 120 and receptacle 101 have been configured to not include dead space downstream of sealing surfaces 159, neither provide any space for the dispensed additive to accumulate. Such accumulation of additive can cause resistance to the movement of the cartridge within the receptacle, bacteria growth, or cross-flavor contamination. Additive accumulation outside of the check valve, where it is partially exposed to air, can evaporate leaving a residue that can inhibit the operation of the pump.

Similar to inlet check valve 153, outlet check valve 158 is configured to be in a normally closed position and is in fluid communication with dose chamber 156. In one exemplary embodiment, inlet check valve 153 is an umbrella valve and outlet check valve 158 is a duckbill valve. Inlet check valve 153, diaphragm 154, and outlet check valve 158 are made from a flexible material, particularly flexible material having memory. Exemplary materials of construction for inlet check valve 153, diaphragm 154, and outlet check valve 158 include, but are not limited to elastomers such as silicone, thermoplastic elastomer (TPE), buna, neoprene, EPDM. One exemplary TPE used to fabricate inlet check valve 153, diaphragm 154, and outlet check valve 158 is commercially available from West Pharmaceuticals, Inc.

Bladder 140 is sealed to a seal flange 166 of pump body 151 such that bladder 140 is in fluid communication with pump opening 152 and thus inlet check valve 153. Sealing bladder 140 to seal flange 166 of pump body 151 enables the elimination of a front sidewall (e.g., to cover open end 137) on housing 130, reducing weight and fabricating costs. Bladder 140 and pump body 151 are inserted into open end 137 of housing 130. Pump body 151 is connected to housing 130 with a heat seal. It is understood, that pump body 151 and housing 130 may be connected by any number of conventional technologies and methods as known to one of ordinary skill in the art, such as snap-fit connections, glue, etc.

Cartridge 120 also includes a retainer 162 that connects (e.g., snap fit, heat seal, threaded engagement, etc.) into cavity 155 of pump body 150 to hold diaphragm 154 within cavity 155 of the pump body. Retainer 162 may also include a valve cap 164 that is connected to retainer 162 using snap pegs 168 as known to one of ordinary skill in the art. Such a cap protects outlet check valve 158 from being exposed to dirt, debris, and damage prior to use. Retainer 162 and cap 164 may be fabricated from plastic materials such as polypropylene. One exemplary material used to fabricate retainer 162 and cap 164 may be a homopolymer 4039 commercially available from BP Amoco Chemical Company. Cap 164 may simply be snapped off by twisting cap 164 to snap pegs 168.

It is understood that inlet and outlet valves 153 and 158 may comprise a variety of conventional one-way or check valves, such as ball valves, spring-loaded valves, or the like. In addition, as one skilled in the art will appreciate, any pump known to one skilled in the art such as positive displacement and centrifugal pumps may be utilized to dispense the additive from the bladder 140 to water within a container. Such exemplary embodiments include, but not limited to piston pumps, peristaltic pumps, bellows-type pumps, piezo-electric pumps, diaphragm pumps (e.g., as described above), rotary vane, etc. Alternatively, cartridge 120 may comprise, in place of pump 150, venture feed, gravity feed, and/or pressurized systems to dispense the additive from bladder 140 into the water.

To fill bladder 140 with an additive, prior to use in the container of the invention, as described herein, a hollow needle (not shown) is inserted into and through inlet check valve 153, which is acting as a seal enclosure over pump opening 152 (i.e., sealing bladder 140) to pull a vacuum within bladder 140. Once the vacuum has been established within bladder 140, the needle is removed. Due to its shape, configuration, and material, inlet check valve 153 automatically reseals the hole the needle created within the inlet check valve, acting as a self-sealing septum as known to one of ordinary skill in the art. A second needle of a syringe-type device (not shown herein) containing the additive is inserted into and through inlet check valve, enabling the additive to be dispensed into bladder 140. Again, due to the shape, configuration, and material of inlet check valve 153, the hole made by the needle reseals itself automatically (e.g., self-sealing septum). The needles and syringe-type device are well understood by one of ordinary skill in the art and will not be described herein.

In operation, cap 164 is twisted off of cartridge 120. Cartridge 120 is inserted into space 102 within guides 103 of receptacle 101 such that planar surface 157 of diaphragm 154 rests against annular protrusion 104, and outlet check valve 158 is inserted through aperture 106 of receptacle 101. Once inserted, a user may have to prime pump 150 to fill chamber 156 with an amount of the additive from bladder 140. For example, the user may selectively apply a force to closed end 136 in the direction of open end 137 (or pump 150) along longitudinal axis A1 of cartridge 120. When the force is applied to housing 130, it presses annular protrusion 104 against planar surface 157, which depresses diaphragm 154 causing outlet check valve 158 to open and chamber 156 to reduce in volume. Chamber's 156 reducing volume forces any substance (e.g., air or an additive) contained within chamber 156 to be dispensed through outlet check valve 158. Once the applied force is released from closed end 136, diaphragm 154 returns back to its normal position due to memory of diaphragm 154, expanding chamber 156 back to its normal volume. Such expansion of chamber 156 causes a vacuum within chamber 156 that bends an annular valve seal 169 of inlet check valve 153 away from pump body 151, opening inlet check valve 153. When inlet check valve 153 is opened, the vacuum within chamber 156 will also pull additive through pump opening 152 into chamber 156 from bladder 140.

Once diaphragm 154 and chamber 156 are back to their normal positions, the inlet and outlet check valves are closed, preventing air from being sucked back into bladder 140 and chamber 156. This process may be repeated several times to prime the pump and fill the chamber 156 with the additive. The pump (and/or dose chamber) may be configured to hold a desired dose (i.e., a prequantified or measured amount of the additive) to be dispensed with one operation of the pump. Exemplary dose amounts of the additive to be dispensed with each pump operation is a volume of about 0.05 ml to about 1.0 ml. In another exemplary embodiment, the dose amount is a volume of about 0.15 ml to about 0.25 ml. Once the chamber is filled with the desired amount of additive (i.e., primed), the cartridge is ready to dispense an amount of additive to water from chamber 156. When a dose of additive is desired, the user applies a force to close end 137 such that protrusion 104 depresses diaphragm 154, causing outlet check valve 158 to open and the amount of additive within chamber 156 to dispense from the outlet check valve 158. As the additive is dispensed from outlet check valve 158, an equal amount of the additive will be pulled from bladder 140 through inlet check valve 153 to replenish chamber 156.

Referring to FIG. 11, receptacle 101 may comprise an interface 170, which may interconnect with cartridge 120. Interface 170 may be a discrete or integrated part of receptacle 101 to prevent dirt, debris, and other substances from entering into water filtration system 110 when cartridge 120 is not in receptacle 101. Interface 170 includes a body 172 having an interface opening 174, a door 176 configured to open or close opening 174, a spring 178 configured to bias cartridge 120 away from interface body 172 when cartridge 120 is positioned within interface 170, and a slot 179 disposed through body 172. Door 176 is in a normally closed position over opening 174. When cartridge 120 is positioned in receptacle 101, door 176 still remains closed over opening 174. However, when a user applies force to closed end 136, moving the cartridge toward the interface body 172, a door opening device 180 (e.g., a cam) positioned on pump body 151 slides through slot 179 to engage door 176. Door opening device 180 moves door 176 away from opening 174, and thus allowing outlet check valve 158 to move through opening 174 and dispense the additive from bladder 140. Once the applied force is removed, spring 178 moves cartridge 120 back away from interface body 172, thus disengaging door opening device 180 from door 176 and closing opening 174. It is also understood that interface 170 may be configured such that door 176 is in a normally closed position until cartridge 120 is inserted into interface 170 and door opening device 180 moves door 176 away from opening 174. In this configuration, interface 170 does not include a spring to bias cartridge 120 away from interface body 172. However, a spring may be used to bias door 176 to its normally closed position.

Figure 12:
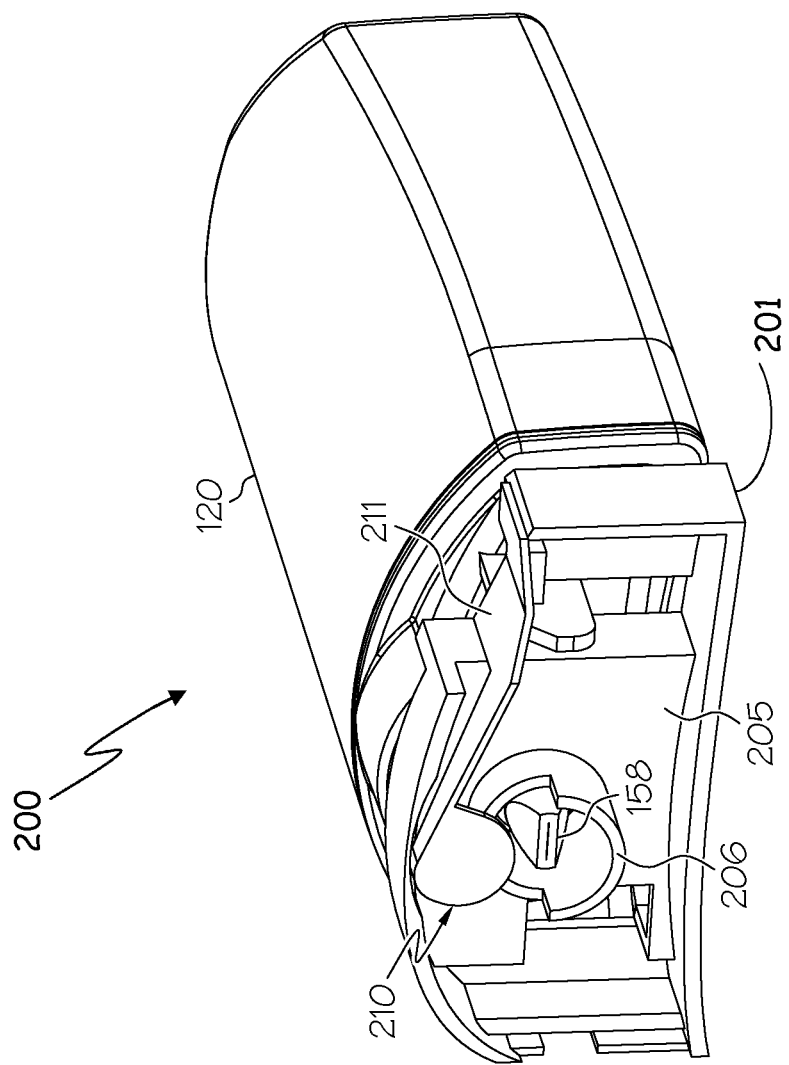
FIG. 12 is a perspective view of an exemplary additive dispensing system according to an embodiment of the present invention.

Another exemplary embodiment of the present invention is illustrated in FIG. 12. In this embodiment, additive dispensing system 200 may include a receptacle 201 configured to receive cartridge 120 in a moving engagement. Receptacle 201 may include a door 210 connected to receptacle 201 near an aperture 206 disposed within a surface 205 of receptacle 201. Door 210 is configured to open and close aperture 206, thus preventing or permitting outlet check valve 158 of cartridge 120 to enter into aperture 206 and through surface 205. A distal end 211 of door 210 is fixedly attached to receptacle 201 such that door 210 is cantilevered from receptacle 201 over aperture 206. In addition, door 210 is spring-biased in a closed position over aperture 206. In this embodiment, door 210 is fabricated from a material having memory or a spring constant that provides this spring-biased. Alternatively, receptacle 201 may include a separate spring (not shown) that engages door 210 to bias it in the closed position over aperture 206. Either cartridge 120 or door 210 may have a cam (not shown) that engages door 210, or vice versa. When a force is applied to cartridge 120 to operate pump 150, the cam moves door 210 away from aperture 206, allowing outlet check valve 158 to dispense the additive through aperture 206 and into a container.

Referring back to FIGS. 1-5, fluid container 10 may also include second additive reservoir 26 positioned such that it may receive and contain the amount of additive 40 dispensed from pump 150 (and/or outlet check valve 158) of cartridge 120. In the exemplary embodiment, second additive reservoir 26 is separate from additive dispensing cartridge 120 and is integral to lid 20. Fluid container 10 may also include a deflector 32 positioned substantially in front of outlet check valve 158. Deflector 32 may be configured and positioned such that when pump 150 dispenses the amount of additive 40 from outlet check valve 158, additive 40 hits deflector 32 and deflects into and is contained by second additive reservoir 26. In the exemplary embodiment, deflector 32 is integral to cover 30. Once additive 40 deflects into second additive reservoir 26, additive 40 is contained within second additive reservoir 26 until fluid container 10 is tilted at an angle such that additive 40 pours from second additive reservoir 26, exiting lid outlet 34 and falling from a lip 35 into a second container (e.g., drinking glass). The exemplary embodiment of the fluid container may configure lip 35 to extend out to or past an outer edge 15 of spout 16 along a hypothetical vertical plane in order to prevent additive 40 from pouring or dripping back into first chamber 22 when being poured from second additive reservoir 26. In another exemplary embodiment, deflector 32 may be designed to cause additive 40 when it deflects from deflector 32 to form into large droplets and then fall into second additive reservoir 26. Such large droplets improve and help ensure that most, if not all, the additive is poured/dispensed from second additive reservoir 26.

Referring to FIGS. 4a and 4b, the exemplary fluid container 10 has an aspect ratio of approximately 2 to 1, which when the first chamber is substantially full with first fluid 3 (having first fluid 3 filled substantially to the top of first chamber 22 as shown in FIG. 4a), it causes first chamber 22 to have a first chamber angle $\Theta$ equal to or less than about 45°, more particularly between about 30° and about 45°. It is understood that the first chamber pour angle may be different angles depending upon the fluid container's aspect ratio, configuration, and/or the amount of first fluid contained within first fluid container. In this exemplary embodiment, it was desired to have additive 40 pour from second additive reservoir 26 before the first fluid poured from first chamber 22. One benefit of designing the additive (40) to pour into second container 5 before first fluid 3 begins to pour into cup 1 is that it improves the mixing of the additive into the first fluid. Therefore, second additive reservoir 26 may be configured to have a pour angle (second additive reservoir pour angle $\alpha$) that is less than first chamber pour angle $\Theta$ in order to permit additive 40 to pour from reservoir 26 before first fluid 3 pours from first chamber 22. The first chamber pour angle $\Theta$ is defined as the angular deviation of a longitudinal axis E-E' of fluid container 10 from a vertical orientation of longitudinal axis E-E' sufficient to cause first fluid 3 to begin to pour from first chamber 22. The second additive reservoir pour angle $\alpha$ is defined as the angular deviation of a longitudinal axis E-E' of fluid container 10 from a vertical orientation of longitudinal axis E-E' sufficient to cause additive 40 to begin to pour from second additive reservoir 26.

The first chamber pour angle $\Theta$ may be dependent upon the level of the first fluid contained within first chamber 22. For example, as shown in FIG. 4a, when first chamber 22 is substantially full (a high level of first fluid 3 contained within first chamber 22), first chamber pour angle $\Theta$ is substantially smaller than the first chamber pour angle $\Theta$ when first chamber 22 is almost empty (a low level of first fluid 3 contained within first chamber 22) as shown in FIG. 4b. In the exemplary embodiment shown, fluid container 10 is configured to have a first fluid pour angle $\Theta$ that is greater than second additive reservoir pour angle $\alpha$ in order to permit additive 40 to pour from second additive reservoir 26 before the first fluid pours from first chamber 22. In another exemplary embodiment, the fluid container's second additive reservoir pour angle $\alpha$ may comprise from about 0° to about 45°, and first fluid pour angle $\Theta$ may comprise from about 0° to about 90° so long as second additive reservoir pour angle $\alpha$ is less than first fluid pour angle $\Theta$ of the fluid container. In still another exemplary embodiment, the fluid container's second additive reservoir pour angle α is less than 30° (e.g., 15°), and first fluid pour angle Θ is equal to or greater than 30°. In yet still another exemplary embodiment, fluid container 10 is configured to have a first chamber pour angle Θ that is greater than the second additive reservoir's pour angle α.

Figure 5:
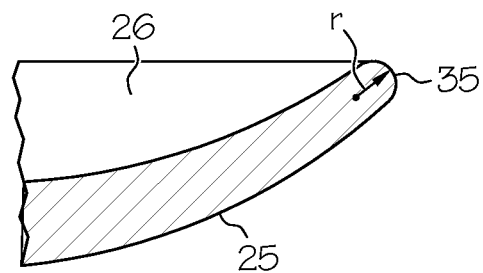
FIG. 5 is partial, side elevational view of the exemplary second additive reservoir according to FIG. 1.

In one exemplary embodiment, lip 35 may comprise an internal radius (r), defining the edge of second additive reservoir 26 as shown in FIG. 5. Lip 35 may be configured with radius (r) of less than or equal to about 0.005 inches. In another exemplary embodiment, radius (r) of lip 35 may be less than or equal to about 0.003 inches. It has been found that fabricating lip 35 with a radius (r) of equal to or less than 0.005 inches provides second additive reservoir 26 with a better roll-off of the additive from lip 35 as the additive is poured from second additive reservoir 26. It is desirable to have such a lip radius for improved roll-off to aid in dispensing most, if not all, of additive 40 from second additive reservoir 26. In other words, to aid in preventing any residual or residue of additive 40 remaining within second additive reservoir 26. This provides fluid container 10 with a lower probability of having any flavor cross-over, if and when, additive dispensing cartridges 120 containing different flavored additives are used with container 10. The decreased residual of additive 40 left in second additive reservoir 26 makes fluid container 10 easier to clean as there is less sticky residue to wash away. This may also decrease the opportunity for bacteria to grow within reservoir 26.

Second additive reservoir 26 includes an interior surface 28 that may be at least partially in contact with additive 40 resting within reservoir 26 as shown in FIGS. 1-3. In one exemplary embodiment, surface 28 may be ultrahydrophobic, ultralyophobic, and/or ultraclean. As used herein, ultrahydrophobic surfaces are surfaces that produce static contact angles greater than 140° with water. As used herein, ultralyophobic structures are surfaces that produce static contact angles greater than 140° with fluids with surface tensions less than that of water, such as oils, alcohols, hydrocarbons, etc. Ultraclean surfaces, as used herein, are surfaces with a low contact angle hysteresis, which is defined as the difference between the advancing and receding contact angles of a fluid on a surface.

With ultraclean surfaces, the contact angle is less important than the roll-off angle (angle above which a sessile drop of fluid spontaneously rolls) and the amount of residual fluid after roll-off (cleanliness). These two fluid characteristics are directly related to the contact angle hysteresis. In one exemplary embodiment, surface 28 is an ultraclean surface having a roll-off angle less than 30°. In another exemplary embodiment, surface 28 is an ultraclean surface having a roll-off angle less than 15°. In yet another exemplary embodiment, surface 28 is an ultraclean surface having a roll-off angle less than 5°.

It has been found that if a surface contains ultrahydrophobicity and ultralyophobicity properties, then low roll-off angles and low residual fluid will also be obtained, and thus ultracleanliness will be achieved. However, for a given surface with a given contact angle, the roll-off angle and cleanliness can be drastically different due to hysteresis in the advancing and receding contact angles. Generally, there are two ways to produce surfaces with ultrahydrophobicity and ultralyophobicity: one is using ultra low surface energy materials; and two is using highly refined surface microtexture (optionally, combined with nanotexture such as hydrophobically modified nanoparticles). In one exemplary embodiment, the surface energy (defined as the surface free energy at 20° C.) of the ultra low surface energy material is less than 25 mN/m. Non-limiting examples of ultra low surface energy materials are fluoropolymers (e.g., polytetrafluoroethylene (PTFE) with a reported surface energy of 20 mN/m, polytrifluoroethylene (PTrFE) with a reported surface energy of 23.9 mN/m, fluoroethylene-propylene (FEP); and perfluoroalkoxy (PFA)) and silicones (e.g., polydimethylsiloxane (PDMS) with a reported surface energy of 19.8 mN/m).

Figure 13A:
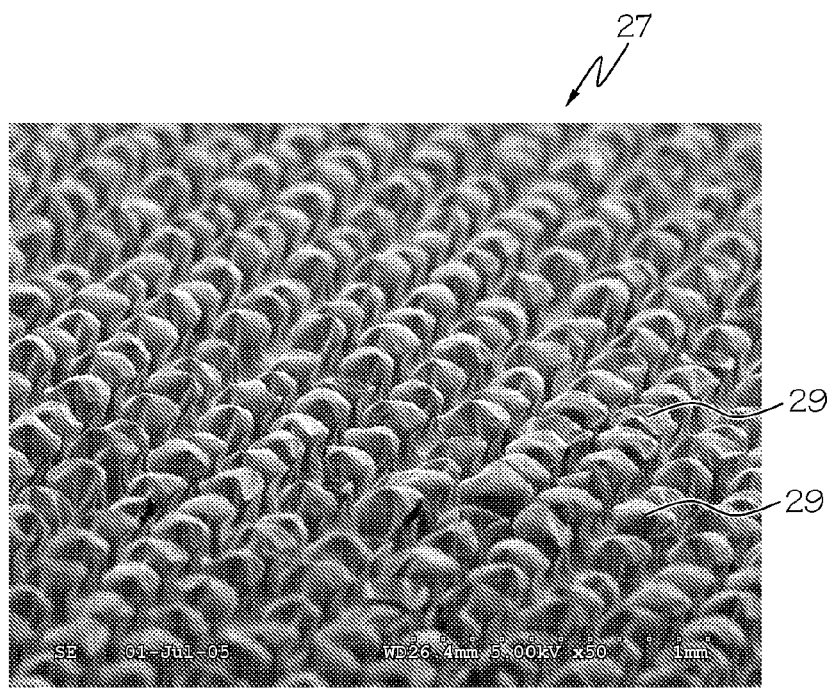
FIG. 13a is a perspective view of an exemplary bubble film according to an embodiment of the present invention.
Figure 13B:
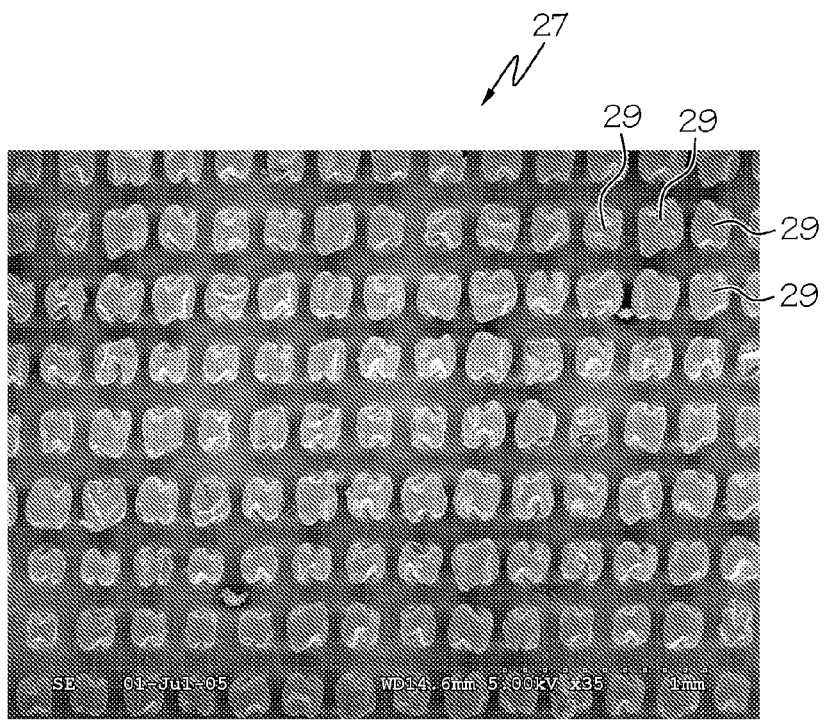

FIGS. 13a and 13b show an exemplary embodiment, wherein surface 28 may be provided with ultrahydrophobic, ultralyophobic, and/or ultraclean properties by fabricating it from a fluoroplasma treated bubble film 27. First, an untreated bubble film 27 containing numerous-approximately 150 micron in height×150 micron in diameter—hollow 3-D protuberances 29 spaced uniformly on a square packing array with approximately 250 micron distance center-to-center is provided. Note that this untreated film is neither ultrahydrophobic, ultralyophobic, nor ultraclean. Then, this untreated bubble film is coated with polymerized fluoro-functional groups via plasma and becomes ultrahydrophobic, ultralyophobic, and ultraclean.

One exemplary method by which the coating may be achieved involves exposing the surface to a plasma that comprises a monomeric unsaturated organic compound. The monomeric unsaturated organic compound may comprise a chain of carbon atoms. The chain of carbon atoms may be optionally substituted by fluorine; provided that the compound is a perfluorinated alkene or acrylate, having a chain of at least seven substituted carbon atoms so as to form an ultralyophobic coating on the substrate. Alternatively, the untreated bubble film may be surface coated with hydrophobic nanoparticles, which will result in the bubble film having ultrahydrophobic, ultralyophobic, and ultraclean properties. A non-limiting example of nanoparticles useful in this disclosure is silica particles treated with fatty acids.

Figure 14A:
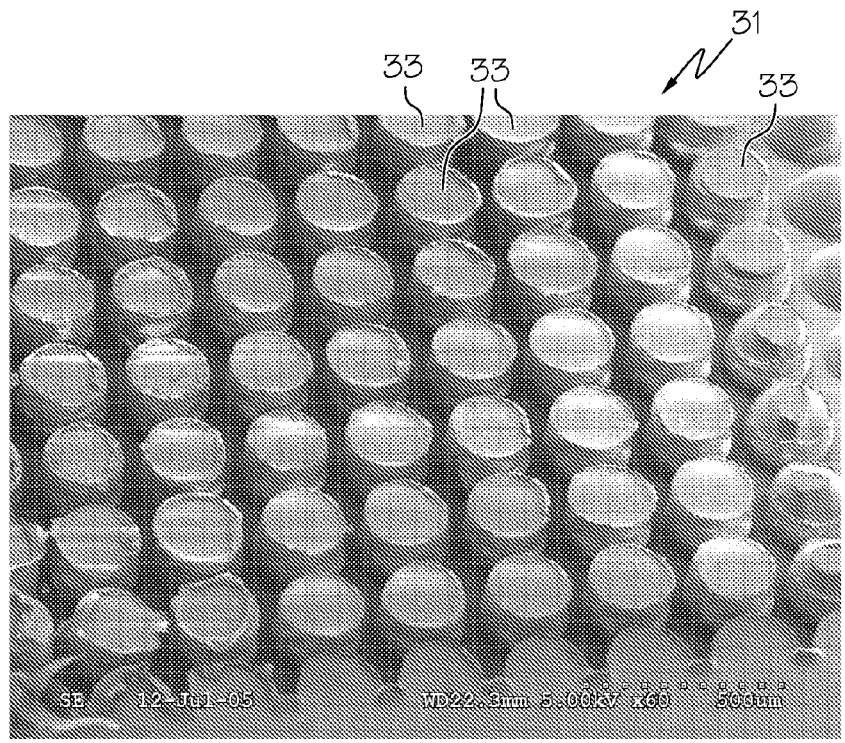
FIG. 14a is perspective view of an exemplary molded film according to an embodiment of the present invention.
Figure 14B:
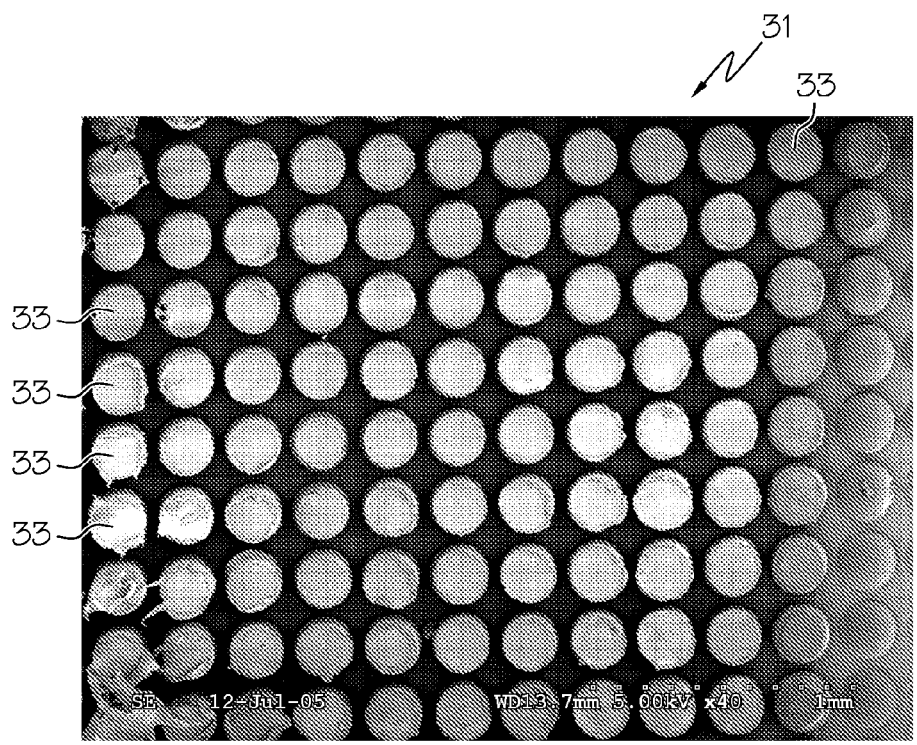

Referring to FIGS. 14a and 14b, yet another exemplary embodiment of a film 31 that may be used to fabricate surface 28 is shown. Surface 28 may be provided ultrahydrophobic, ultralyophobic, and ultraclean properties by fabricating it from compression molded PFA or FEP thermoplastic, fluoropolymer film 31. As set forth above, this film may also include solid protuberances 33 (for mechanical stability). The starting material of the film may also be a material having a low surface energy, which permits film 31 to avoid of having to use a coating as found in the exemplary embodiment set forth above in FIGS. 14a and 14b. The PFA/FEP film may be compression-molded onto a micro-etched screen having a female pattern similar to the bubble film geometry set forth above. Once the PFA/FEP film is compression-molded onto the micro-etched screen, the resulting film was ultrahydrophobic, ultralyophobic, and ultraclean. Film 31 may be used to fabricate surface 28 to provide it with ultrahydrophobic, ultralyophobic, and ultraclean properties. In addition, it has been found that the film may also make surface 28 mechanically robust, thus enabling surface 28 to survive consumer use activity such as rubbing, cleaning, washing, and spraying.

Such ultrahydrophobicity, ultralyophobicity, and ultracleanliness provides several benefits to fluid container 10. First, because of these properties, little to no traces of additive 40 will remain in second additive reservoir 26 when the container 10 is tilted and additive 40 is dispensed from the second additive reservoir. In other words, little to no residue of additive 40 will remain on surface 28 of reservoir 26. With little to no residue left in reservoir 26, a user will experience no flavor cross-over when different flavored, additive cartridges 120 are used within container 10. Such properties also make cleaning the fluid container much easier because very little to no additive residue is left behind on surface 28, which tends to be sticky and hard to clean. Additionally, this may reduce the opportunity for bacteria growth. Second, the tilt angle required to evacuate or empty additive 40 from second additive reservoir 26 is less and therefore requires less consumer effort to achieve the desired result.

It should also be understood that any and all surfaces of fluid container 10, including but not limited to surfaces of additive dispensing cartridge 120, lid 20, and/or cover 30, may be configured to be ultrahydrophobic, ultralyophobic, and ultraclean. For example, deflector 32 may comprise a surface 38 having ultrahydrophobic, ultralyophobic, and ultraclean properties. If both deflector 32 and second additive reservoir 26 are provided with ultrahydrophobic, ultralyophobic, and ultraclean properties, then fluid container 10 should permit little to no residue to build-up on its surfaces. Since in this exemplary embodiment additive cartridge 120 is disposable, it is not necessary to provide its surfaces with such properties. However, in other exemplary embodiments cartridge 120 may include surfaces having ultrahydrophobic, ultralyophobic, and ultraclean properties as well.

Figure 15:
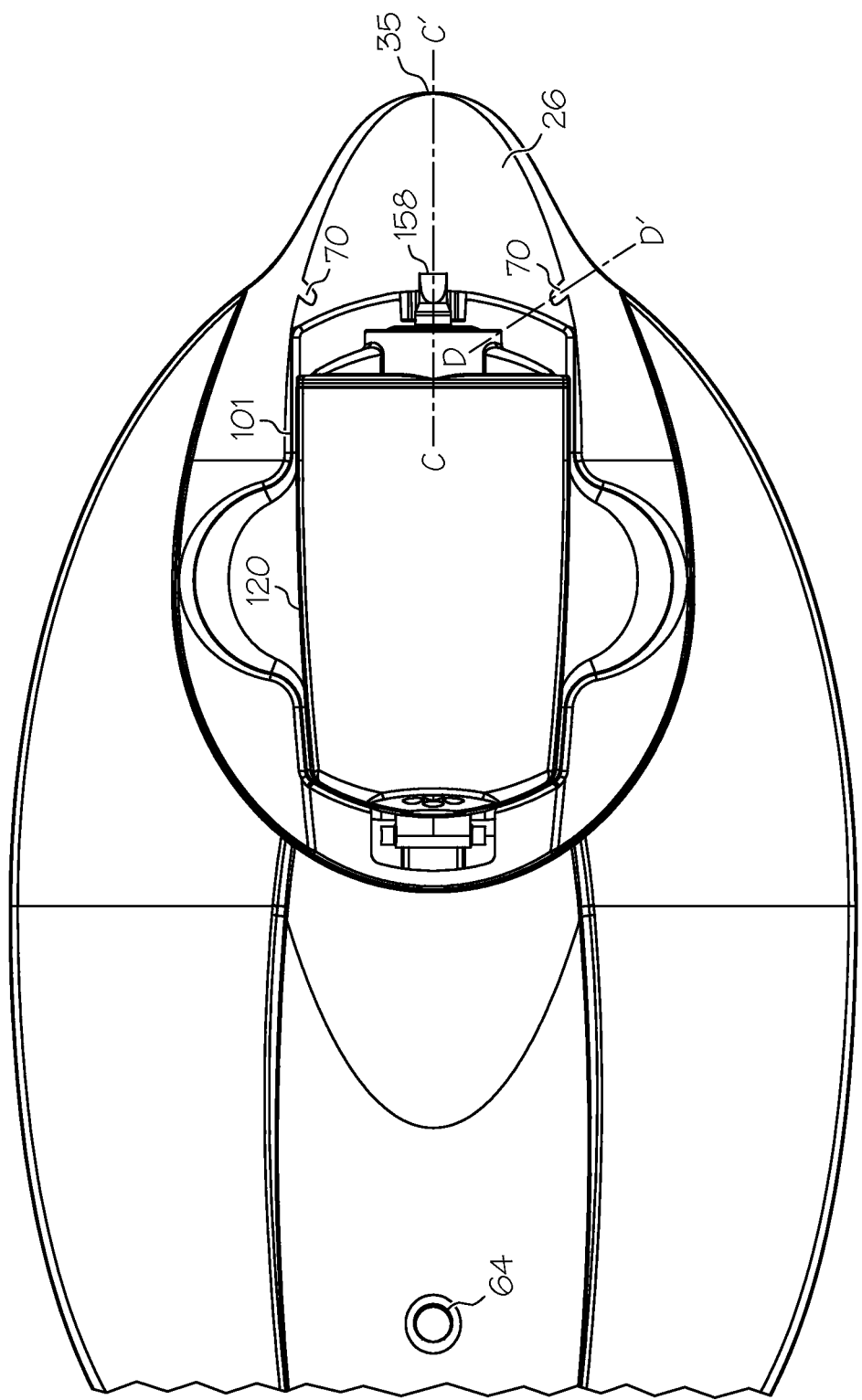
FIG. 15 is a top plan view of an exemplary fluid container, wherein the second additive reservoir includes two rinse channels according to another embodiment of the present invention.
Figure 16:
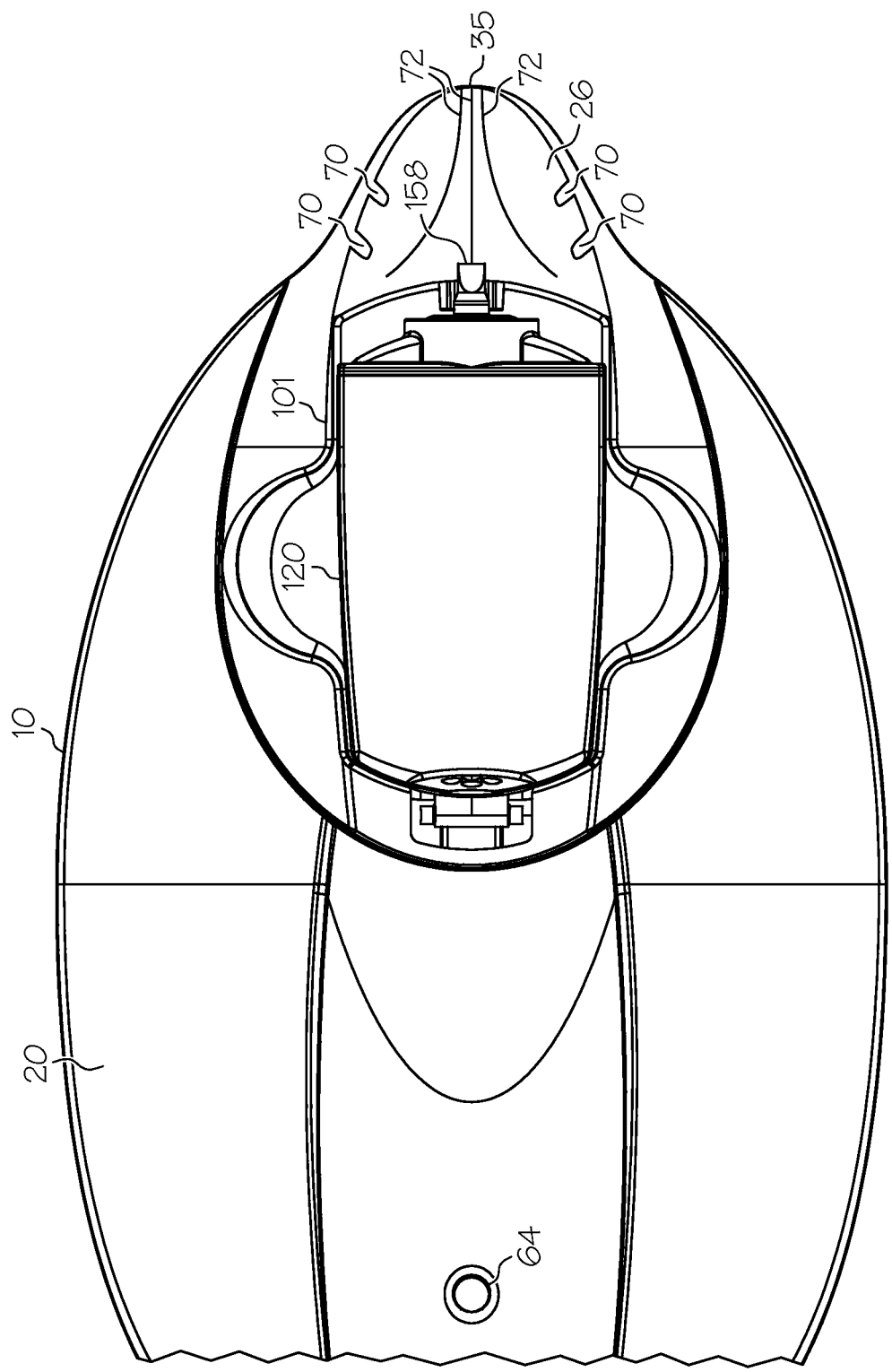
FIG. 16 is a top plan view of an exemplary fluid container, wherein the second additive reservoir includes rinse channels and flow channels according to another embodiment of the present invention.

In another embodiment of the present invention, second additive reservoir 26 includes one or more rinse channels 70 along edges of the second additive reservoir as shown in FIGS. 15 and 16. Rinse channels 70 may be configured such that they are in fluid communication with first chamber 22 in order to permit a small quantity of first fluid 3 to flow into second additive reservoir 26 when fluid container 10 is tilted to dispense first fluid 3 and additive 40. The small quantity of first fluid 3 that flows into second additive reservoir 26 rinses the second additive reservoir when fluid container 10 is tilted. The rinse of reservoir 26 allows the dispensing of substantially all of additive 40 during tilting (pouring) leaving essentially no additive 40 in second additive reservoir 26 at the end of the tilting (pouring) action.

In yet another exemplary embodiment, first fluid 3 is channeled to second additive reservoir 26 by restricting the flow of first fluid 3 and developing a head pressure of sufficient magnitude to force first fluid 3 through rinse channels 70. A non-limiting example of such flow restriction is a very small average gap between pour spout 16 and lip 35 of the second additive reservoir that would provide an orifice or gap of sufficient size that will not substantially impact the flow rate of first fluid 3, for example, a flow rate of greater than 2 liters/min. A non-limiting example of the average gap between pour spout 16 and lip 35 may be less than 5 mm. Another exemplary of the average gap may be less than 2 mm. Yet another exemplary of the average gap may be less than 1 mm.

Figure 17:
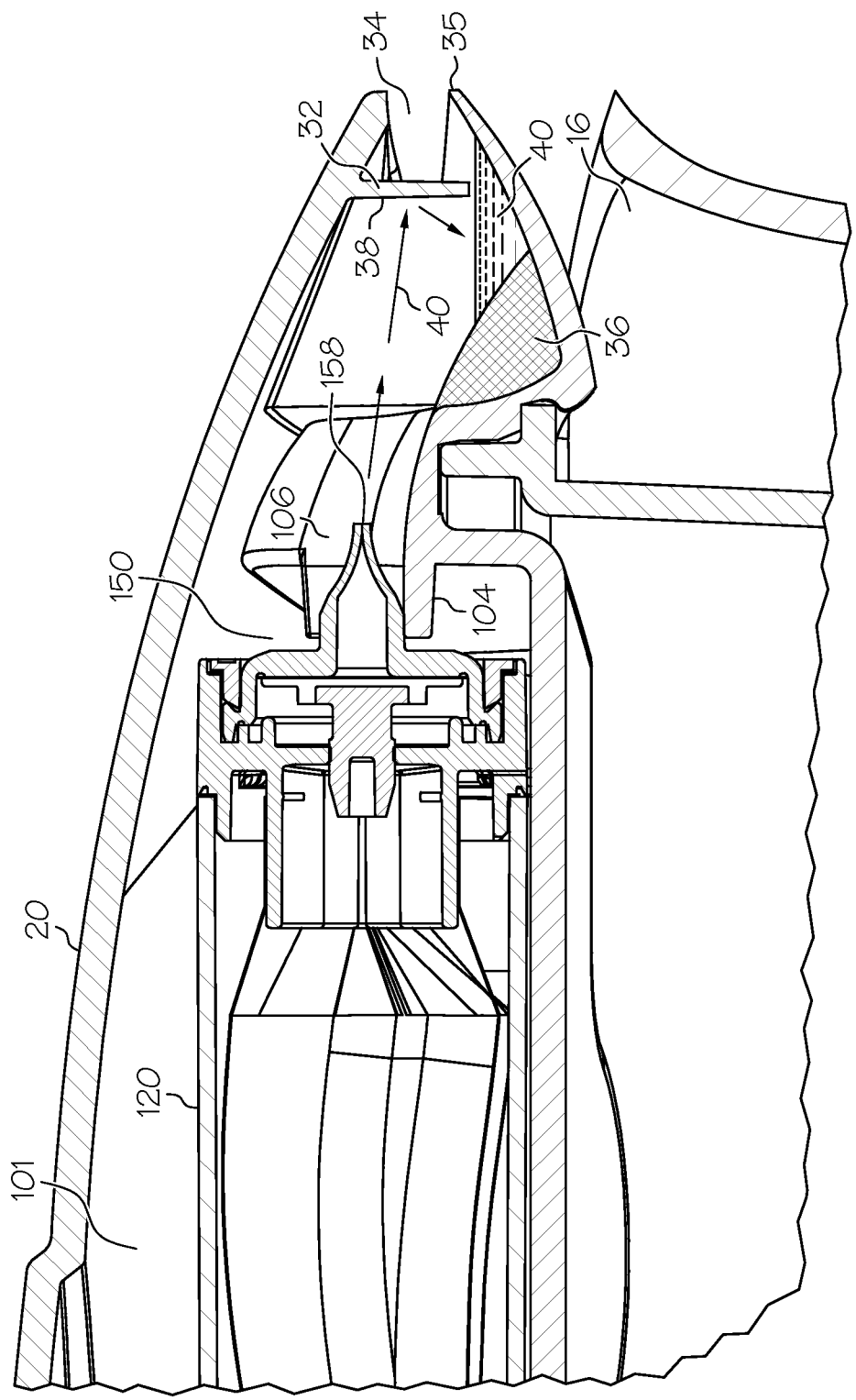
FIG. 17 is a side elevational view of an exemplary fluid container, wherein the second additive reservoir includes an elevated section adjacent to the additive dispensing system according to another embodiment of the present invention.

Also, rinse channels 70 may be located symmetrically around the edge of second additive reservoir 26 and closer to additive outlet valve 158 than to lip 35 as shown in FIGS. 15 and 16. Also, as shown in FIG. 15, the exemplary embodiment is optionally shown with rinse channel 70 having an axis D-D' at an acute angle from an axis C-C' of the second additive reservoir, i.e., each rinse channel "points" generally towards additive outlet valve 158. In yet another exemplary embodiment, second additive reservoir 26 comprises flow channels 72 that direct additive 40 towards lip 35 of reservoir 26 (FIG. 16) when the container is tilted. In still yet another embodiment, second additive reservoir 26 may comprise an elevated section 36 adjacent to the additive dispensing system and additive outlet valve 158 as shown in FIG. 17. Elevated section 36 helps direct additive 40 toward the lip area 35 of the second additive reservoir and thus reduces the chances for leaving a residue when container 10 returns to the horizontal position after tilting (pouring) action is completed.

Although deflector 32 is shown in the exemplary embodiment as integral to cover 30, and second additive reservoir 26 is shown as an integral to lid 20, it should be understood that deflector 32 and second additive reservoir 26 may be components that are separate from cover 30 and lid 20, respectively. It should also be understood that deflector 32 and reservoir 26 may be permanently or temporarily attached to either cover 30 or lid 20 without departing from the spirit and scope of the present invention. Also, it should be understood that deflector 32 and second additive reservoir 26 may both be affixed to either one of cover 30 or lid 20 without departing from the spirit and scope of the present invention.

Lid 20 may also include a button 50 connected to an arm 52, wherein arm 52 engages closed end 136 of additive dispensing cartridge 120. When a user pushes button 50, it moves arm 52 forward such that it engages cartridge 120 causing the cartridge to slide forward in receptacle 101. When additive dispensing cartridge 120 slides forward within receptacle 101, pump 150 engages annular protrusion 104, causing pump 150 to dispense additive 40 from outlet check valve 158. Button 50 may be positioned on an end 21 of lid 20, opposite lid outlet 34 and optionally near handle 18, such that a user may grasp container 10 by handle 18 and actuate pump 150 via button 50 to dispense additive 40 from additive dispensing cartridge 120 into the second additive reservoir 26. Alternatively, a user may grasp and hold container 10 by handle 18 in order to pour first fluid 3 from first chamber 22 into a second container (e.g., drinking glass) and simultaneously push button 50 to dispense additive 40 from additive dispensing cartridge 120 into the same second container. If container 10 is tilted at the appropriate angle, additive 40 may totally bypass second additive reservoir 26 and dispense directly into the second container. In yet another exemplary embodiment, fluid container 10 may be configured to not include second additive reservoir 26 and thus permit the user to dispense the additive 40 directly into first chamber 22 or the second container if container 10 is tilted at the appropriate angle. It should also be understood that the present invention may include a variety of conventional actuators to operate pump 150 such as levers, switches, or any other actuators as known to one of ordinary skill in the art and may locate button 50 in a variety of other positions along container 10 without departing from the spirit and scope of the present invention. As can be seen and understood, the present invention permits the dispensing of additive 40 before, during, or after the pouring of first fluid 3 into a second container.

Fluid container 10 may include one or more life indicators configured to indicate the remaining life of filter 23 and/or cartridge 120. The exemplary fluid container shown in FIGS. 1-5 may include a life indicator 60. Life indicator 60 is configured to count the number of operations of pump 150 (doses). It is known how many doses of additive are contained within bladder 140 and thus how many operations of pump 150 are required to empty bladder 140. Life indicator 60 may be then configured after a certain number of doses of additive have been dispensed to signal or indicate to a user that bladder 140 is almost depleted of additive. In the exemplary embodiment shown, life indicator 60 includes a trigger 62, a light 64, and a circuit/power source 66. Life indicator 60 is a conventional life indicator as known to one of ordinary skill in the art. Arm 52 includes a cam 54 that actuates trigger 62 with each push of button 50, thus providing a count for each operation of pump 150 (dispense of an amount of additive 40 (dose) from pump 150). Life indicator 60 is configured to energize light 64 when a specified number of pump operations (counts) have been delivered, signaling to a user that additive dispensing cartridge 120 needs to be replaced and/or is close to being empty. Light 64 may comprise any conventional light as known to one of ordinary skill in the art such as a LED or LCD. Life indicator 60 may also be configured to signal the remaining life of filter 23 by energizing a light, which may include light 64 or a second light, after a specified number of pump operations have been performed. Such a count may be based upon an assumption that each pour of fluid container 10 will include an average number of pump operations (doses of the additive).

In another embodiment, the life indicator may comprise a read switch configured to count the number of dispenses of pump 150 or a magnetic/tilt switch configured to count the number of pours to signal to a user the remaining life of cartridge 120 and/or filter 23. In still another embodiment, lid 20, cartridge 120, first chamber 22, or second additive reservoir 26 may include a measuring device (not shown) to track and/or estimate the amount of additive and/or first fluid that has been dispensed from the cartridge and/or the fluid container, and thus trigger an indicator to signal the remaining life of cartridge 120 or filter 23. The measuring device may include, but not be limited to, a weight sensor to measure the amount of additive left within bladder 140, an electrical or electrode sensor to measure the change in resistivity of the fluid in the bladder, a RFID tag (Radio Frequency Identification), opacity sensor, or similar such devices as used in other industries where a remaining amount of a consumable in a reservoir is tracked such as, for example, in the inkjet industry. The measuring device need not be described herein as such technology is known to one of ordinary skill in the art.

In another exemplary embodiment, cartridge 120 may comprise a visible level gauge (not shown) to allow the user to determine the amount of additive remaining in the reservoir. In addition, it is understood that cartridge 120 and/or receptacle 101 may include a communication link such as a TAB circuit or radio frequency connection to communicate data (e.g., the amount of additive remaining within bladder) and signals between the cartridge, water filter system, and/or a computer or controller. In yet another embodiment, the additive dispensing system 100 further comprises an additive life indicator (not shown) operable to indicate the remaining amount of additive in bladder 140. For example, bladder 140 may comprise a visible level gauge to allow the user to determine the amount of additive remaining in the reservoir. In still yet another embodiment, additive dispensing system 100 may further comprise a totalizer which is operable to calculate the amount of additive dispensed from the additive dispensing system, and configurable to indicate the remaining amount of additive remaining in bladder 140. In such an arrangement, a flow meter or totalizer is coupled to the additive life indicator and sends a signal to the additive life indicator to cause it to light up or flash after a predetermined volume of additive has flowed through the additive outlet.

In an alternative embodiment, the life indicator may comprise a monitoring mechanism such as a microchip containing a programmable clock. The life indicator could be implemented as, for example, light emitting diodes or LCD (liquid crystal display) readouts, wherein a clock is programmed to cause the life indicator to, for example, light up or flash after a predetermined period of time has passed since installing a new cartridge 120 and/or filter 23, for example, two months. A user could then replace the cartridge 120 and/or filter with a new cartridge 120 and/or filter 23 and reset the clock. For example, fluid container 10 may include a life indicator (not shown) disposed along lid 20. The life indicator is configured to indicate the life remaining of a filter of a water filtration system (not shown) within fluid container 10. The life indicator may be designed to change indication after a certain time. In one exemplary embodiment, the life indicator may be configured to reset upon holding an actuation button (not shown) for 5 seconds. After resetting the life indicator, the life indicator may be configured to flash a green light when the fluid container is poured (to indicate proper function). After one month, the life indicator may be configured to change the green light to a yellow light upon pouring. After two months, the life indicator may be configured to change the yellow light to a red light, thereby indicating the end of the filter life. Once the filter is changed, the life indicator may be reset by again holding the actuation button for 5 seconds.

In another exemplary embodiment, the additive dispensing system 100 may further comprise a controller (not shown) in communication with pump 150 and outlet check valve 158. The controller may be configured to regulate the amount of additive dispensed through the outlet check valve. The controller may comprise a separate limiting valve (not shown). Alternatively, outlet check valve 158 may be a limiting valve. The limiting valve is operable to limit or regulate the amount of additive, if any, that is dispersed from pump 150. In another embodiment, the controller may comprise a microprocessor in communication with the limiting valve. In one exemplary embodiment, the controller may comprise a dial or other input device to allow the user to select the amount of additive to be dispensed into the filtered water.

In yet another exemplary embodiment, fluid container 10 may further comprise a water filtration system (not shown) that includes an inlet in communication with second chamber 24, a filter (e.g., filter 23), an outlet, and a mineral content analyzer in fluid communication with the outlet of the water filter. The mineral content analyzer may be operable to measure the concentration of one or more minerals in the filtered water. The water filtration system may further comprise a controller in communication with the mineral content analyzer. Additive dispensing system 100 may include multiple additive dispensing cartridges 120, each with a limiting valve in communication with pump 150 as described above herein. The limiting valves are in communication with a controller, such that the controller is operable to dispense one or more additives (such as minerals) to yield a predetermined concentration of additives in the filtered water. For example, the mineral content analyzer, detects a level of calcium in the filtered water and reports the calcium level to the controller. The controller determines that additional calcium is desired in the final treated water product, and as such, sends a signal to the limiting valve to add and/or increase the amount of additive (i.e. calcium) being dispensed from pump 150 to the second additive reservoir 26 to be poured, ultimately, into a glass with the filtered water from first chamber 22. As one skilled in the art will appreciate, any controller known to one skilled in the art may be utilized to control the amount of additive dispensed into the filtered water.

All documents cited in the Detailed Description of the Invention are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fluid container for dispensing a human-consumable fluid and a human-consumable additive, comprising:
a shell comprising a handle;

a first chamber for containing the human-consumable fluid disposed within the shell;

an additive dispensing cartridge disposed adjacent to the first chamber, the additive dispensing cartridge further comprising a housing, a reservoir disposed within the housing for containing the human-consumable additive, and an outlet valve connected to the housing such that the outlet valve is in fluid communication with the reservoir, the outlet valve includes a pair of sealing surfaces, wherein the additive dispensing cartridge does not include any surfaces in its fluid path downstream of the pair of sealing surfaces; and an actuator having a first end and a second end, the actuator disposed adjacent to the shell such that when the actuator is actuated the first end engages an end of the housing and the second end is positioned adjacent the handle and on a side of the container opposite the outlet valve.

2. The fluid container of claim 1, further comprising a receptacle connected to the shell, wherein the additive dispensing cartridge is received within the receptacle and moves within and relative to the receptacle.

3. The fluid container of claim 2, wherein the additive dispensing cartridge includes a pump connected to the housing and in fluid communication with the reservoir, and wherein when the additive dispensing cartridge moves within the receptacle it engages the receptacle to operate the pump such that an amount of additive is dispensed from the reservoir through the outlet valve.

4. The fluid container of claim 2, further comprising a lid positioned over an open end of the shell, and wherein the receptacle is disposed on the lid.

5. The fluid container of claim 1, further comprising a receptacle connected to the housing, wherein the receptacle slidingly and removably receives the additive dispensing cartridge such that the additive dispensing cartridge slides within the receptacle in order to dispense an amount of additive from the reservoir through the outlet valve.

6. The fluid container of claim 1, wherein the outlet valve is not in fluid communication with the first chamber.

7. The fluid container of claim 1, wherein the outlet valve is a check valve.

8. The fluid container of claim 7, further comprising a pump connected to the housing such that the pump is in fluid communication with the reservoir and the outlet valve.

9. The fluid container of claim 1, further comprising a second additive reservoir disposed adjacent to the additive dispensing cartridge such that an amount of additive is dispensed from the outlet valve through the pair of sealing surfaces into the second additive reservoir, separate from the first fluid.

10. The fluid container according to claim 9, wherein the second additive reservoir comprises one or more rinse channels along edges of the second additive reservoir, and wherein the one or more rinse channels are in fluid communication with the first chamber and the second additive reservoir in order to carry the human-consumable fluid into the second additive reservoir to rinse the second additive reservoir when the fluid container is tilted.

11. The fluid container according to claim 9, wherein the second additive reservoir comprises flow channels to direct the additive towards a lip of the second additive reservoir.

12. The fluid container according to claim 9, wherein the second additive reservoir comprises an elevated section adjacent to the additive dispensing cartridge to collect additive between the elevated section and a lip of the second additive reservoir.

13. The fluid container according to claim 9, further comprising a spout, and wherein the second additive reservoir is partially positioned above the spout.

14. The fluid container according to claim 9, further comprising a deflector positioned substantially in front of the outlet valve and above the second additive reservoir such that the deflector deflects the amount of additive dispensed from the outlet valve into the second additive reservoir.

15. The fluid container according to claim 1, actuator, when engaging the end of the housing applies a force to the housing.

16. The fluid container according to claim 1, further comprising a life indicator configured to track a cumulative number of dispenses of an amount of additive from the additive dispensing cartridge and indicate the corresponding life remaining for the additive dispensing cartridge based upon the cumulative number of dispenses of the amount of additive.

17. The fluid container according to claim 1, further comprising a second chamber for receiving an unfiltered human-consumable fluid and a filter positioned between and in fluid communication with the first and second chambers such that the unfiltered human-consumable fluid may flow from the second chamber through the filter and enter into the first chamber as a filtered human-consumable fluid.

18. The fluid container according to claim 1, wherein at least a portion of the first end of the actuator comprises an arm, and wherein the second end of the actuator comprises a button connected to the arm.

\* \* \* \* \*

UNITED STATES PATENT AND TRADEMARK OFFICE
CERTIFICATE OF CORRECTION

PATENT NO. : 8,413,844 B2
APPLICATION NO. : 12/702542
DATED : April 9, 2013
INVENTOR(S) : Richard Alan Arett et al.

Page 1 of 1

It is certified that error appears in the above-identified patent and that said Letters Patent is hereby corrected as shown below:

Title Page,
Item "(57)    ABSTRACT
A fluid container for dispensing a first fluid and a consumable additive. The fluid container includes a first chamber for containing a first fluid and an additive dispensing system. The first chamber is configured such that the first fluid may be dispensed from the first chamber. The additive dispensing system selectively operable to dispense an amount of additive and is not in fluid communication with the first chamber."

should read:

--(57)    ABSTRACT
A fluid container for dispensing a first fluid and a consumable additive. The fluid container includes a first chamber for containing a first fluid and an additive dispensing system. The first chamber is configured such that the first fluid may be dispensed from the first chamber. The additive dispensing system is selectively operable to dispense an amount of additive and is not in fluid communication with the first chamber.--;

In the Claims
Col. 20, Claim 15, Line 28, "claim 1, actuator" should read --claim 1, the actuator--.

Signed and Sealed this
Seventeenth Day of December, 2013

Margaret A. Focarino
*Commissioner for Patents of the United States Patent and Trademark Office*